United States Patent
Gu et al.

(10) Patent No.: US 10,262,078 B2
(45) Date of Patent: Apr. 16, 2019

(54) SYSTEMS AND METHODS FOR OPTIMIZING PERFORMANCE OF GRAPH OPERATIONS

(71) Applicant: Apple Inc., Cupertino, CA (US)

(72) Inventors: Haijie Gu, Seattle, WA (US); Yucheng Low, Seattle, WA (US); Carlos Guestrin, Seattle, WA (US)

(73) Assignee: Apple Inc., Cupertino, CA (US)

( * ) Notice: Subject to any disclaimer, the term of this patent is extended or adjusted under 35 U.S.C. 154(b) by 397 days.

(21) Appl. No.: 14/619,025

(22) Filed: Feb. 10, 2015

(65) Prior Publication Data

US 2015/0227582 A1 Aug. 13, 2015

Related U.S. Application Data

(60) Provisional application No. 61/938,126, filed on Feb. 10, 2014, provisional application No. 62/026,591, filed on Jul. 18, 2014.

(51) Int. Cl.
G06F 17/30 (2006.01)

(52) U.S. Cl.
CPC .... *G06F 17/30958* (2013.01); *G06F 17/3089* (2013.01); *G06F 17/30442* (2013.01); *G06F 17/30321* (2013.01); *G06F 17/30362* (2013.01); *G06F 17/30368* (2013.01); *G06F 17/30516* (2013.01)

(58) Field of Classification Search
CPC ......... G06F 17/30958; G06F 17/30362; G06F 17/30368; G06F 17/30516; G06F 17/30321; G06F 17/30371; G06F 17/30377; G06F 17/30442; G06F 17/30554

USPC ......... 707/713, 703, 798, 802, 812
See application file for complete search history.

(56) References Cited

U.S. PATENT DOCUMENTS

| | | | |
|---|---|---|---|
| 5,551,029 A | 8/1996 | Jagadish et al. | |
| 6,009,271 A | 12/1999 | Whatley | |
| 6,256,651 B1 | 7/2001 | Tuli | |
| 7,590,639 B1 * | 9/2009 | Ivanova | G06F 17/30377 707/999.002 |
| 7,899,799 B2 * | 3/2011 | Furuya | G06F 17/30353 707/703 |
| 8,875,145 B2 * | 10/2014 | Atterbury | G06F 9/4436 717/140 |
| 9,165,035 B2 * | 10/2015 | McSherry | G06F 17/30554 |

(Continued)

*Primary Examiner* — Dangelino N Gortayo
(74) *Attorney, Agent, or Firm* — Robert C. Kowert; Meyertons, Hood, Kivlin, Kowert & Goetzel, P.C.

(57) ABSTRACT

A method of optimizing graph operations is performed by a computing system. The method comprises: (1) receiving a first request to perform a first operation on a first graph, where the first graph comprises a set of vertices and a set of edges, each edge connecting a pair of vertices, and each vertex having one or more associated properties; (2) logging the first request, but not performing the first operation; (3) receiving a second request to perform a second operation; (4) logging the second request, but not performing the second operation; (5) receiving a query for data from the first graph, where the data includes property values for one or more vertices; (6) in response to the query: (a) generating a second graph by optimizing and performing the first and second operations; and (b) returning data responsive to the query, where the returned data is based on the second graph.

20 Claims, 18 Drawing Sheets

(56) References Cited

U.S. PATENT DOCUMENTS

| | | | |
|---|---|---|---|
| 9,235,652 B1* | 1/2016 | Jeffery | G06F 17/30563 |
| 9,563,486 B1* | 2/2017 | Narsude | G06F 17/30569 |
| 9,792,325 B2* | 10/2017 | Bruno | G06F 17/30442 |
| 2002/0198984 A1 | 12/2002 | Goldstein et al. | |
| 2004/0267747 A1* | 12/2004 | Choi | G06F 17/30171 |
| | | | 707/999.008 |
| 2005/0001837 A1 | 1/2005 | Shannon | |
| 2005/0283337 A1 | 12/2005 | Sayal | |
| 2007/0008317 A1 | 1/2007 | Engelhardt et al. | |
| 2007/0038978 A1 | 2/2007 | Meijer et al. | |
| 2007/0214111 A1* | 9/2007 | Jin | G06F 17/30563 |
| 2009/0271362 A1* | 10/2009 | Moestl | G06F 17/30442 |
| 2012/0150791 A1 | 6/2012 | Willson | |
| 2012/0158623 A1 | 6/2012 | Bilenko et al. | |
| 2012/0221528 A1 | 8/2012 | Renkes et al. | |
| 2012/0239609 A1 | 9/2012 | Zhao et al. | |
| 2012/0310916 A1* | 12/2012 | Abadi | G06F 17/30445 |
| | | | 707/713 |
| 2013/0166535 A1 | 6/2013 | Valentin | |
| 2014/0282180 A1* | 9/2014 | Orofino | G06F 3/0484 |
| | | | 715/771 |
| 2014/0304251 A1* | 10/2014 | Bornea | G06F 17/30463 |
| | | | 707/718 |
| 2015/0142724 A1* | 5/2015 | Nair | G06F 17/30592 |
| | | | 707/602 |
| 2015/0142777 A1* | 5/2015 | Mindnich | G06F 17/30424 |
| | | | 707/722 |

* cited by examiner

Vertex Associated
Properties Table 410

| | Vertex | Property | Value |
|---|---|---|---|
| 402-1 | Vertex A | Property 412-1 | Value 413-1 |
| | | Property 412-2 | Value 413-2 |
| | | Property 412-3 | Value 413-3 |
| 402-2 | Vertex B | Property 414 | Value 415 |
| 402-3 | Vertex C | Property 416-1 | Value 417-1 |
| | | Property 416-2 | Value 417-2 |
| 402-4 | Vertex D | Property 418 | Value 419 |
| | ⋮ | | |
| 402-10 | Vertex J | Property 420-1 | Value 421-1 |
| | | Property 420-2 | Value 421-2 |
| | | Property 420-3 | Value 421-3 |
| | | Property 420-4 | Value 421-4 |
| 402-11 | Vertex K | Property 422-1 | Value 423-1 |
| | | Property 422-2 | Value 423-2 |

Figure 4B

| Partition | Vertices | Edges |
|---|---|---|
| Partition 502-1 | Vertices A, B, and D | Edges A and B |
| Partition 502-2 | Vertices C, D, E, F, and G | Edges C, D, E, F, G, and H |
| Partition 502-3 | Vertices F, H, I, J, and K | Edges I, J, K, L, M, and N |

Figure 5B

SYSTEMS AND METHODS FOR OPTIMIZING PERFORMANCE OF GRAPH OPERATIONS

RELATED APPLICATIONS

This application claims priority to U.S. Provisional Patent Application No. 61/938,126, entitled "Optimizing Parallel Machine Learning for Graphs," filed Feb. 10, 2014, and U.S. Provisional Patent Application No. 62/026,591, entitled "User-Interface for Developing Applications that Apply Machine Learning," filed Jul. 18, 2014, both of which are hereby incorporated by reference in their entirety.

TECHNICAL FIELD

The disclosed implementations relate generally to dataflow processing systems and more specifically to methods and systems for optimizing graph operations in graph-structured computation frameworks.

BACKGROUND

Exponential gains in hardware technology have enabled sophisticated machine learning and data mining techniques to be applied to increasingly challenging real-world problems. While high-level parallel frameworks simplify the design and implementation of large-scale data processing systems, they do not naturally or efficiently support many important data mining and machine learning algorithms. Efficient distributed parallel algorithms for handling large scale data are required. However, designing and implementing efficient and provably correct parallel algorithms is extremely challenging.

In recent years, large-scale distributed graph-structured computation has been central to tasks ranging from targeted advertising to natural language processing. However, for efficient use of large-scale graphs there is a need for scalable analytics processing capabilities.

SUMMARY

Disclosed implementations address the above deficiencies and other problems associated with large-scale graph-structured computations. The various implementations described herein include systems, methods, and/or devices used for optimizing graph operations in graph dataflow processing systems.

A graph dataflow processing system, as described herein, provides scalable analytics processing capabilities for large graphs. In some implementations, the dataflow processing system handles a sequence of transformations on immutable data, where each transformation operation conceptually generates a new copy of the data (as transformed). The physical data storage, however, may be different. Some implementations perform the transformations in ways that reduce processing time, improve throughput rate, or reduce storage space requirements.

For example, suppose X is a graph whose vertices are people and products, and each edge from a person vertex to a product vertex represents the person's evaluation of the product. Each vertex and each edge has some properties, such as a name. A sample transformation on this graph creates a new graph X' that filters the edges of X, resulting in a new graph X' that includes just those edges whose rating is at least 0.5 ("rating" is a property of the edges in this example). The graph X' has the same vertices as X, but has fewer edges. The properties of the vertices and remaining edges are unchanged. In Python®, this transformation may be expressed as X'=filter(X, lambda x: x.rating>=0.5).

Disclosed implementations take advantage of immutable graphs to optimize the processing in various ways, including:

lazy evaluation. Intermediate tables are not generated or only partially generated as needed. For example, if a user applies a sequence of two operations, but the intermediate graph is not actually accessed by the user, then only the final graph needs to be stored. In addition, the two operations can be combined in some instances.

query optimization. The sequence of transformation operations can be reordered or combined to execute more quickly. For example, suppose a user applies two transformations, where the first transformation alters 100 millions vertices, and the second transformation filters the graph to only 1000 vertices. The optimizer can reverse the order, applying the filter first, and thus the other transformation applies to a much smaller set of vertices.

reference counting. Some implementations separate graph structure (the vertices and edges) from the properties (e.g., name or rating). In this way, a transformation that alters only property values of a graph X can reuse the structure, and the system only needs to track the number of references to the structure. When the reference count goes to zero, the structure is deleted.

Because the graph data structures are immutable, each operation on a graph creates a new graph instance. For example, suppose g is a graph object, and the user executes the operation g=g.add_vertices([users]). This implicitly creates a new graph object $g_2$, destroys the original graph g, then renames $g_2$ to g.

Next, consider a sequence of such transformations, such as:

g=g.add_vertices([users])
g=g.add_edges([network])
g=g.add_vertices([items])
g=g.add_edges([ratings])

The immutable dataflow permits this sequence of such graph modifications to be lazily evaluated. In other words, g is not fully constructed until the user executes some operation that queries the data in the graph g. For example, the user may issue a command such as:

print "The graph has ", g.num_vertices( ), "vertices."

Construction and mutation of graph data structures are complex operations, so the ability to batch together collections of operations can provide substantial performance benefits.

The immutability of graph objects permit further optimizations by sharing of unmodified data across multiple graph objects. For example, consider a large graph representing a social network where users have a large number of properties such as name, email address, zip code, and so on. Consider an operation that transforms the graph by selecting a subset of the properties, resulting in a graph that has the same structure but fewer properties. With an immutable graph representation, the new graph can completely share exactly the same structure and data with the original graph, while simply restricting the result of queries. For example, suppose the function select_fields( ) performs the subset operation. In this case, a user may execute:

names_only=g.select_fields("name")
get_names=names_only.get_vertices( )

The first operation creates a new graph where the vertices have only the "name" property, and in the second operation the get_vertices( ) query returns only the name of each vertex. Because the names_only graph shares the same data as the graph g, the select_fields( . . . ) operation requires practically no computation at all.

Some implementations track graph transformations in ways similar to a version-control system. While each modification of a graph may generate a new version of the graph (or a new version of the entire repository), only new copies of modified data are actually made. The unmodified data is just maintained.

As noted above, some implementations split a graph representation into two parts: the structure (vertices and edges) and the data (properties and corresponding property values). The structure of the graph defines the connectivity between vertices, whereas the data defines the information that is stored in the graph, including the properties of each vertex, and the properties of each edge. By separating structure and data, implementations are able to perform optimizations that would not otherwise be possible. For example, consider a large social network on which a user would like to compute page ranks. The page rank operation will return a new graph object, which has exactly the same structure as the original graph, but contains a field called "pagerank" on each vertex. Because the new graph has the same structure as the original graph, the two graphs can share the structure information, while having different graph data. This reduces memory, storage, and processing requirements.

Some implementations further generalize "splitting" by partitioning some graphs into multiple segments. Graph modifications on a particular segment (e.g., a segment containing a popular celebrity in a social network graph), can then avoid the costly operation of updating the entire graph. The operation updates just the modified segment, while sharing the remaining segments with previous generations of the graph.

Some implementations include a method of optimizing graph operations. The method is performed by a computing system having one or more processors and memory. The method receives a first request to perform a first operation on a first graph. The first graph includes a set of vertices and a set of edges, where each edge connects a pair of vertices. Each vertex has one or more associated properties. The method logs the first request, but does not perform the requested first operation. The method then receives a second request to perform a second operation on the first graph, and logs the second request without performing the requested second operation. Subsequently, the method receives a query for data from the first graph, where the data includes property values for one or more vertices or edges. In response to the query, the method generates a second graph by optimizing and performing the first and second requested operations on the first graph, and returns data responsive to the query, where the returned data is based on the second graph.

In some instances, the first and second requested operations are performed simultaneously. In some instances, the first and second requested operations are combined into a third operation, and the third operation is applied to the first graph. The result of the third operation is equivalent to sequentially performing the first operation and the second operation on the first graph, but reduces the computation and eliminates storing an intermediate graph.

In some implementations, all of the graphs are immutable.

In some implementations, the second graph represents a second version of the first graph in a version-control schema.

In some implementations, the first graph includes a first graph structure and a first set of properties. The first graph structure includes the set of vertices and the set of edges, and the first set of properties includes the one or more properties corresponding to one or more vertices in the set of vertices.

In some implementations, the second graph shares the first graph structure (e.g., they share the same physical data that defines the vertices and edges). Generating the second graph includes generating a second set of properties by performing the first and second requested operations on the first set of properties.

In some implementations, the method stores the first graph. In some implementations, the first graph structure is stored separately from the first set of properties.

In some implementations, the first graph is partitioned into a plurality of sections, and each section is stored separately.

In some instances, when the second graph is generated, the first and second requested operations are applied only to a subset of the sections of the first graph.

In some instances, some of the edges have one or more associated properties, with associated property values.

Any of the methods described above can be performed by a system having one or more processors, memory, and one or more programs stored in the memory for execution by the one or more processors. The one or more programs include instructions for receiving a first request to perform a first operation on a first graph. The first graph includes a set of vertices and a set of edges, where each edge connects a pair of vertices. Each vertex has one or more associated properties. The programs include instructions for logging the first request without performing the requested first operation. The programs also include instructions for receiving a second request to perform a second operation on the first graph and logging the second request without performing the requested second operation. The programs include instructions for receiving a query for data from the first graph. The data includes property values for one or more vertices or edges. The programs include instructions that respond to the query by generating a second graph. The instructions optimize and perform the first and second requested operations on the first graph, and return data responsive to the query. The returned data is based on the second graph.

In some implementations, the system includes one or more servers and one or more client devices.

In some implementations, the system is configured to operate in accordance with any of the methods described above.

Some implementations include a non-transitory computer readable storage medium, storing one or more programs for execution by one or more processors of a system. The one or more programs include instructions for performing any of the methods described herein.

Numerous details are described herein in order to provide a thorough understanding of the example implementations illustrated in the accompanying drawings. However, the disclosed methods may be practiced without many of the specific details, and the scope of the claims is only limited by those features and aspects specifically recited in the claims. Furthermore, well-known operations, algorithms, and components have not been described in exhaustive detail so as not to unnecessarily obscure more pertinent aspects of the implementations described herein.

BRIEF DESCRIPTION OF THE DRAWINGS

For a better understanding of the aforementioned implementations of the invention as well as additional implementations thereof, reference should be made to the Detailed Description below, in conjunction with the following drawings in which like reference numerals refer to corresponding parts throughout the figures. The drawings, however, merely illustrate the more pertinent features of the present disclosure and are therefore not to be considered limiting.

FIG. 4B is a conceptual illustration of a mapping of vertices and associated properties in accordance with some implementations.

FIG. 5B is a conceptual illustration of a mapping of partitions and associated vertices and edges in accordance with some implementations.

Figure 1:
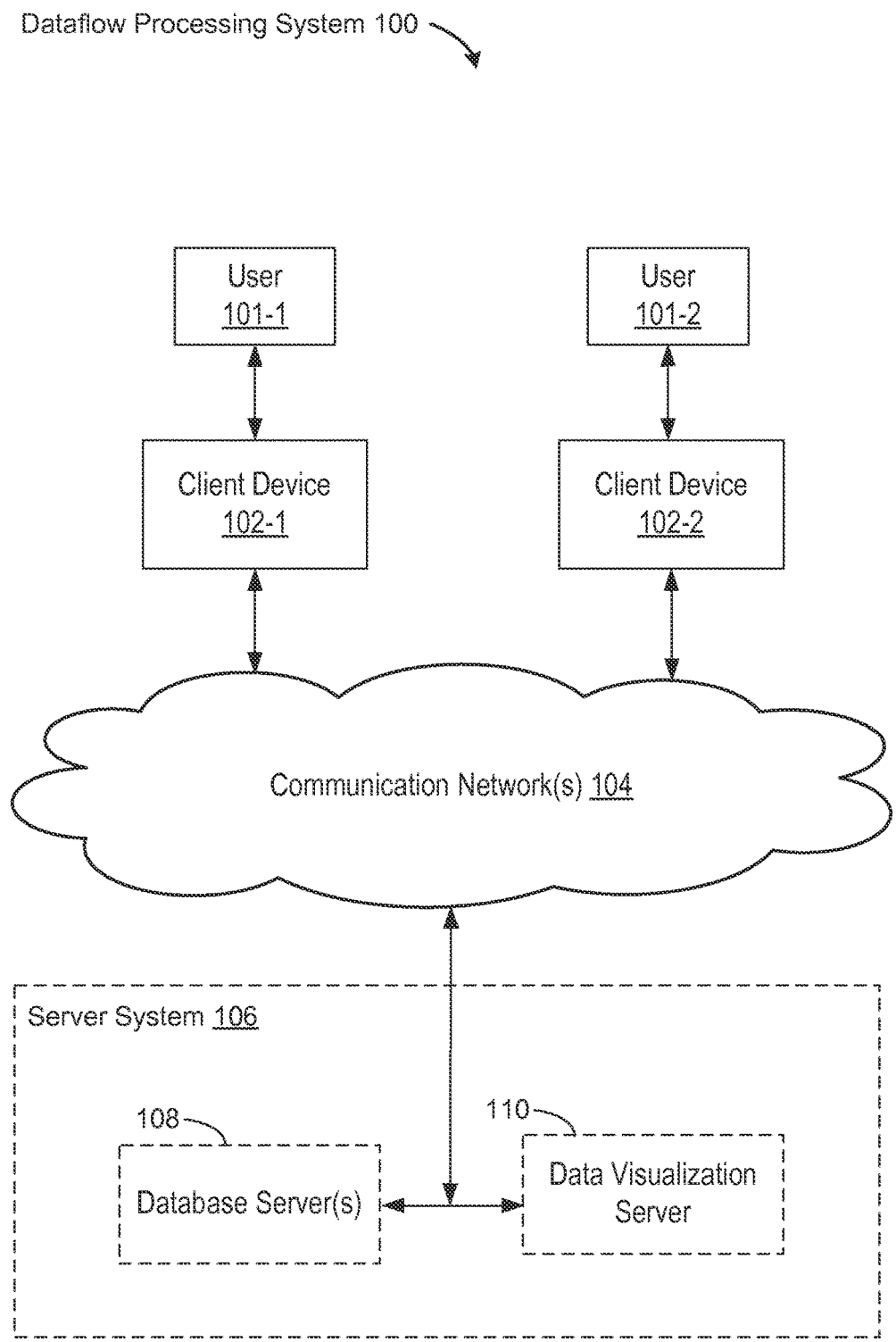
FIG. 1 is a block diagram illustrating an implementation of a graph dataflow processing system in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DETAILED DESCRIPTION

FIG. 1 illustrates conceptually a context in which some implementations operate. Specifically, FIG. 1 illustrates a graph dataflow processing system 100. While some example features are illustrated, various other features have not been illustrated for the sake of brevity and so as not to obscure more pertinent aspects of the example implementations disclosed herein. A graph dataflow processing system 100 includes client devices 102 (e.g., client device 102-1 and client device 102-2) and associated users 101 (e.g., User 101-1 and User 101-2) coupled, via communication network(s) 104, to the server system 106. In accordance with some implementations, the server system 106 includes one or more database server(s) 108 and one or more data visualization servers 110, which may be implemented using one or more servers 300.

Examples of the communication network(s) 104 include local area networks ("LAN") and wide area networks ("WAN"), e.g., the Internet. Communication network(s) 104 may be implemented using any known network protocol, including various wired, wireless, and optical protocols, such as e.g., Ethernet, fibre channel, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 106 includes one or more standalone data processing servers 300, or a distributed network of computers. In some implementations, the server system 106 also employs various virtual devices and/or services of third party service providers (e.g., third-party cloud service providers) to provide the underlying computing resources and/or infrastructure resources of the server system 106.

In some implementations, the database server(s) 108 store graphs (also sometimes called graph data structures) and/or graph data (also sometimes called graph information or graph data elements) and receive, and/or respond to, queries and operation requests. Graph data includes one or more graph vertices, one or more graph edges, and one or more properties (also sometimes called fields, graph fields, or graph properties). The properties are associated with a respective vertex or a respective edge, and each property has one or more values (also called property values, data values, or graph data values). The one or more graph vertices and the one or more graph edges are sometimes collectively referred to as a graph structure, graph structure information, or graph structure data.

In some implementations, the data visualization server 110 receives graph data (e.g., graph dataflow data) from one or more databases (e.g., the database 234 or 324) or from other devices (e.g., a client device 102-1) and generates visual graphs, tables, charts, and/or other visual representations of the data.

Figure 2:
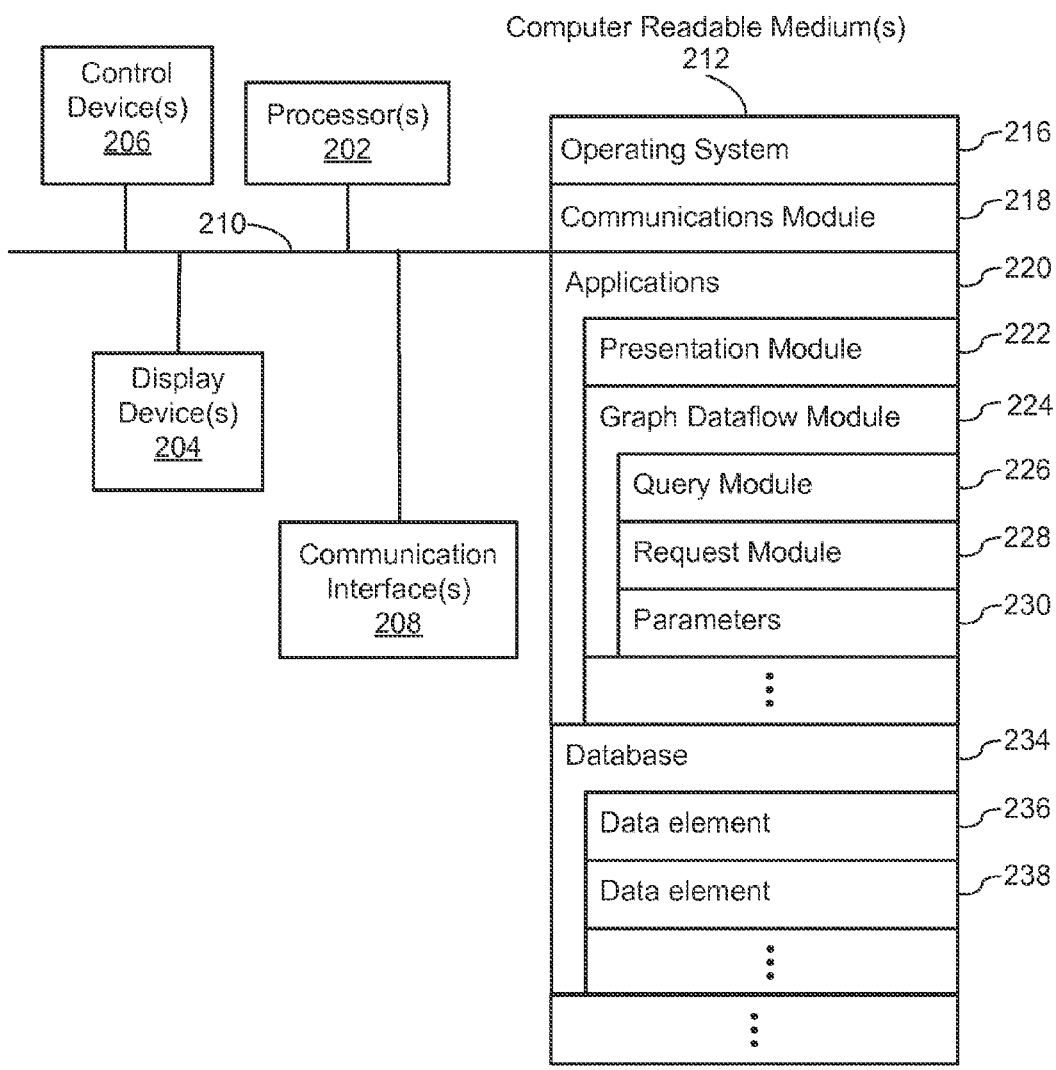
FIG. 2 is a block diagram illustrating a client device in accordance with some implementations.

FIG. 2 is a block diagram illustrating a client device 102-1 used by a user 101-1 in accordance with some disclosed implementations. The client device 102-1 is any suitable computer device, such as a desktop computer, a laptop computer, a tablet device, a netbook, an internet kiosk, a personal digital assistant, a mobile phone, a smart phone, a gaming device, or any other computing device. The client device 102-1 includes one or more processors 202 (e.g., one or more CPUs/cores) for executing modules, programs, and/or instructions stored in computer readable medium(s) 212 and thereby performing processing operations. The device 102-1 also includes one or more display devices 204 (e.g., a monitor), one or more control devices 206 (e.g., a keyboard, mouse, trackball, and the like), one or more communication interfaces 208 (e.g., a wireless network interface), one or more computer-readable mediums 212, and one or more communication buses 210 for interconnecting these components. The communication buses 210 optionally include circuitry that interconnects and controls communications between device components. A client devices 102-1 is sometimes called a client computer or a client system. In some implementations, a client device 102-1 is associated with a plurality of users.

In some implementations, a client device 102-1 includes a "soft" keyboard, which is displayed as needed on a display device 204, enabling a user 101-1 to "press keys" that appear on a display. In some implementations, a client device 102-1 includes a touch screen display (also sometimes called a touch sensitive display), a track-pad, a digital camera, and/or any number of supplemental devices to add functionality. In some implementations, a client device 102-1 includes a user interface. The user interface includes one or more output devices that enable presentation of media content, including one or more speakers and/or one or more visual displays. The user interface also includes one or more input devices, including user interface components that facilitate user input such as a keyboard, a mouse, a voice-command input unit or microphone, a touch screen display, a touch-sensitive input pad, a gesture capturing camera, or other input buttons or controls.

In some implementations, a client device 102-1 includes one or more types of memory. The memory includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory, or alternatively the non-volatile memory device(s) within the memory, is a non-transitory computer readable storage medium (e.g., computer readable medium 212). Optionally, computer readable medium 212 includes one or more storage devices remotely located from processor(s) 202.

In some implementations, the memory, or the non-transitory computer readable storage medium of the memory (e.g., computer readable medium 212), stores the following programs, modules, and data structures, or a subset or superset thereof:
- an operating system 216, which includes procedures for handling various basic system services and for performing hardware dependent tasks;
- a communications module 218, which is used for connecting the client device 102-1 to other computers and devices via the one or more communication network interfaces 208 (wired or wireless) and one or more communication networks 104, such as the Internet, other wide area networks, local area networks, metropolitan area networks, and so on;
- a plurality of applications 220, including presentation module 222 for enabling presentation of information (e.g., a user interface for a web page or an application program, audio and/or video content, text, etc.) at the client device via one or more output devices (e.g., displays, speakers, etc.) associated with a user interface;
- the plurality of applications 220 includes a graph dataflow module 224, which receives and/or responds to, operation requests (e.g., via the request module 228) and/or data queries (e.g., via the query module 226) using one or more parameters 230;
- an input processing module (not shown) for detecting one or more user inputs or interactions from one of the one or more input devices and interpreting the detected input or interaction; and
- one or more databases 234 for storing a plurality of data elements (e.g., data elements 236 and 238). The data elements may be used to construct or modify a graph, including the vertices, the edges, and properties of the vertices and edges.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the computer readable medium 212 stores a subset of the modules and data structures identified above. In some implementations, the computer readable medium 212 stores additional modules and/or data structures not described above.

Although FIG. 2 shows a client device 102-1, FIG. 2 is intended more as functional description of the various features that may be present rather than as a structural schematic of the implementations described herein. In practice, and as recognized by those of ordinary skill in the art, items shown separately could be combined and some items could be separated. For example, in some implementations, the control device(s) 206 are combined with the display device(s) 204 in the form of a touch screen display. In some implementations, the presentation module 222 is combined with (e.g., a component of) the graph dataflow module 224.

Figure 3:
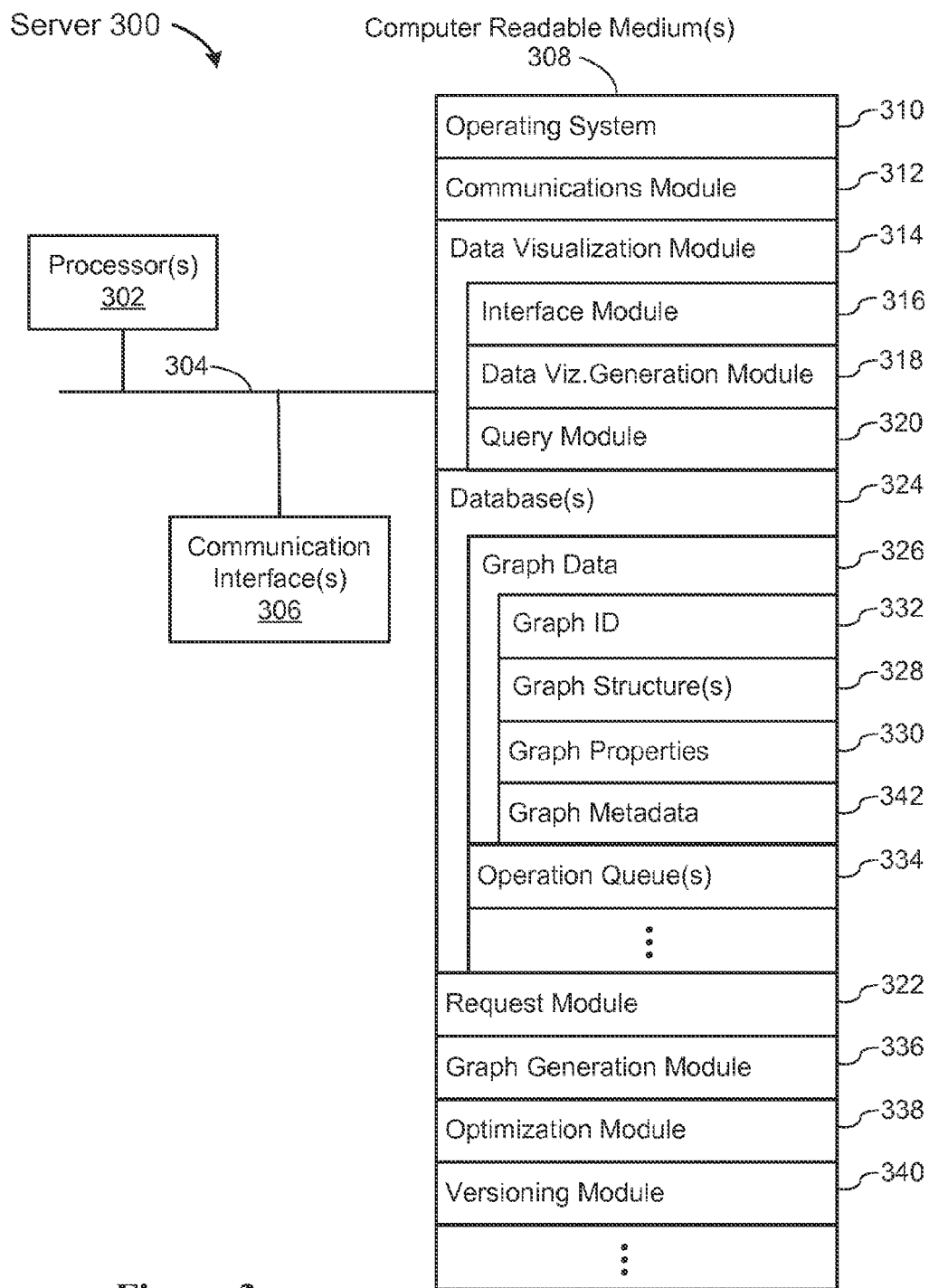
FIG. 3 is a block diagram illustrating a server system in accordance with some implementations.

FIG. 3 is a block diagram illustrating a server 300. In some implementations, a server 300 is a component of a server system 106. In some implementations, a server system 106 includes a plurality of servers 300. In some implementations, a server 300 includes one or more database servers 108 and one or more data visualization servers 110. In some implementations, a server 300 is distributed across multiple computers. A server 300 includes one or more processors 302 (e.g., one or more CPUs/cores) for executing modules, programs, and/or instructions stored in a computer readable medium(s) 308 and thereby performing processing operations. A server 300 also includes communication interface(s) 306 (e.g., a wireless network interface), a computer readable storage medium(s) 308, and one or more communication buses 304 for interconnecting these components. The communication buses 304 may include circuitry that interconnects and controls communications between server components. A server 300 is sometimes called a server computer.

In some implementations, a server 300 includes one or more types of memory. The memory includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory, or alternatively the non-volatile memory device(s) within the memory, is a non-transitory computer readable storage medium (e.g., computer readable medium 308). The computer readable medium 308 may include one or more storage devices remotely located from processor(s) 302.

In some implementations, the communications interface(s) 306 include wired communication port(s) and/or wireless transmission and reception circuitry. The wired communication port(s) receive and send communication signals via one or more wired or optical interfaces, e.g., Ethernet, Universal Serial Bus (USB), FIREWIRE, fibre channel, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The communications interface 306 enables communication between the system 300 with networks 104, such as the Internet, an intranet and/or a wireless network, such as a cellular telephone network, a wireless local area network (LAN) and/or a metropolitan area network (MAN), and other devices such as a client device 102-1.

In some implementations, the memory, or the non-transitory computer readable storage medium of the memory (e.g., the computer readable medium 308), stores the following programs, modules, and data structures, or a subset or superset thereof: an operating system 310, a communications module 312, a data visualization module 314, and one or more database(s) 324.

The operating system 310 includes various software components and/or drivers for controlling and managing general system tasks (e.g., memory management, storage device control, power management, etc.) and facilitates communications between various hardware, firmware, and software components.

The communications module 312 facilitates communications between the server 300 and other devices using the network communications interface 306. For example, the communications module 312 may communicate with a communication interface 208 of a client device 102-1.

The data visualization module 314 receives data (e.g., graph data) from one or more databases (e.g., database(s) 324) and generates visual graphs, tables, charts, and/or other visual representations of the data. In some implementations, the data visualization module 314 includes the following sub-modules, or a subset or superset thereof: an interface module 316, a data visualization generation module 318, and a query module 320. The interface module 316 includes a user interface for generating, displaying, and/or updating visual representations of data. The data visualization generation module 318 generates visual graphs, tables, charts, and/or other visual representations of the data. The query module 320 receives queries (e.g., queries sent from a client device 102-1) for graph data and/or sends query requests for graph data to one or more databases (e.g., database(s) 324).

The database(s) 324 store graph data 326. In some implementations, each graph is assigned a graph ID 332, which is used in all communications (e.g., to identify the graph to modify or query). Typically later versions of the same graph use the same graph ID 332, but have an assigned version number, and thus the (graph ID, version no.) pair uniquely identify a graph version. In some implementations, the graph ID 332 or the version number are stored as part of the graph metadata 342.

The graph data 326 includes graph structure data 328, graph properties 330, and graph metadata 342. In some implementations, the graph data 326 is partitioned into segments and stored in the database(s) 324 in accordance with the partitioning. In some implementations, the database(s) 324 store the graph structure data 328 separately from the graph properties 330, but in some implementations, the structure 328 and properties 330 are combined. In some implementations, the database(s) 324 store copies of data elements stored in a client database 234 (e.g., data elements 236).

Figure 9:
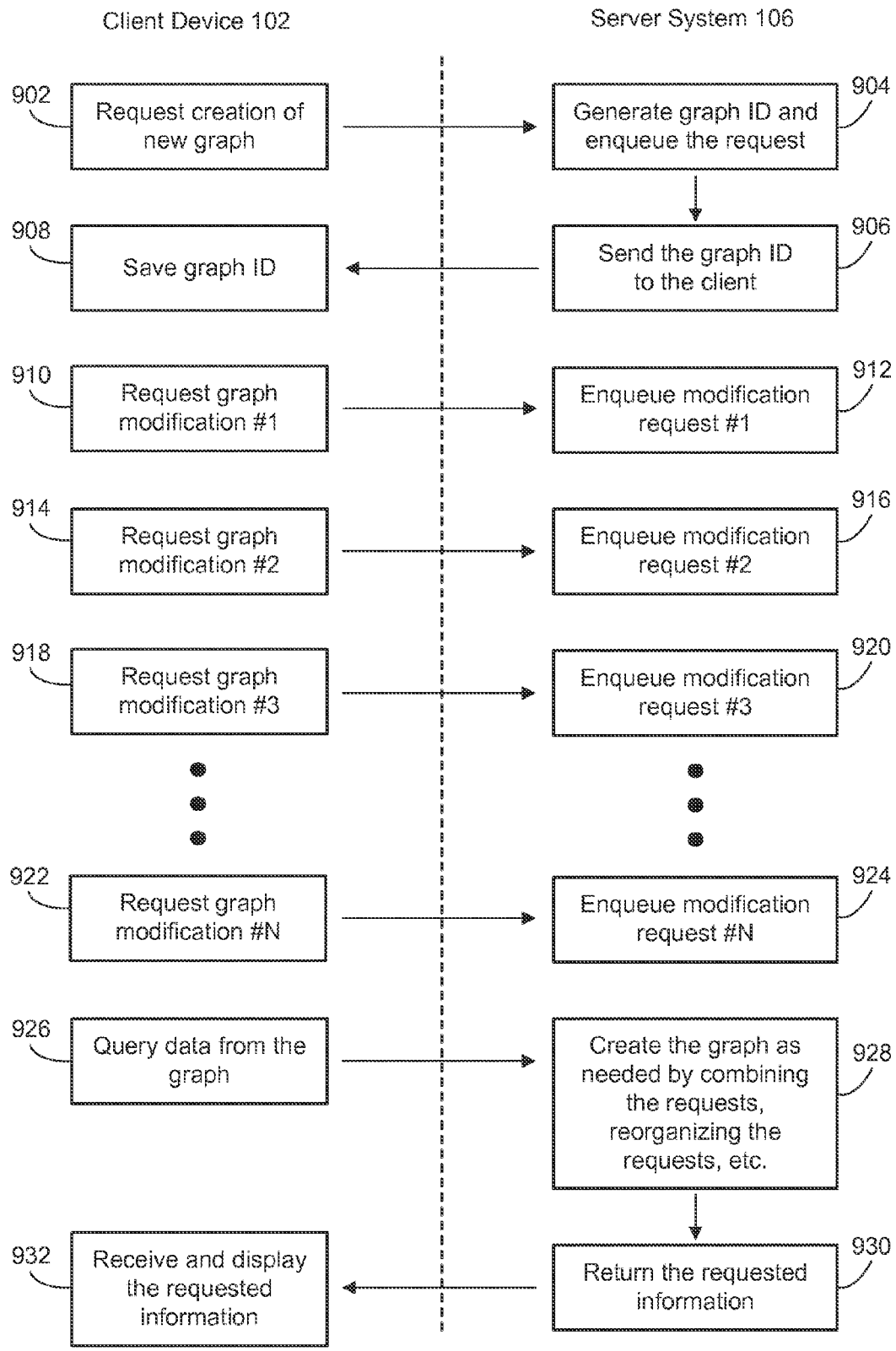
FIG. 9 provides an example process flow for a dataflow processing system in accordance with some implementations.

In some implementations, as graph operation requests are received they are placed into an operation queue 334. The queued operations are not executed until needed, as illustrated in FIG. 9 below. In some instances, the queued operations are combined, reordered, or otherwise modified in order to optimize the processing.

In some implementations, the server 300 includes the following modules, or a subset or superset thereof: a request module 322, a graph generation module 336, an optimization module 338, and a versioning module 340.

The request module 322 receives operation requests (e.g., operation requests sent from a client device 102-1) to construct or modify a graph stored in one or more databases database(s) 324. Operation requests include requests to modify a corresponding graph structure 328, graph properties 330, or graph metadata 342 associated with a graph. The metadata 342 may include data corresponding to graph access times, graph data modification times, operation pipelining, logical to physical mapping for graph data, graph versioning, and so on. In some implementations, the metadata 342 is stored remotely from database(s) 324.

The graph generation module 336 generates graphs (e.g., generates a new version of an existing graph) or graph data. The optimization module 338 increases the overall speed of operations in various ways, including pipelining operation requests or combining operations. In some implementations, the optimization module 338 is able to eliminate processing altogether by generating new graph versions only as required by query requests. In some implementations, the creation of new graph versions is controlled by a separate versioning module 340. In some implementations, the versioning module 340 generates a new version of a graph each time a graph is modified. In some implementations, the graph metadata 342 stores both logical versions of each graph (e.g., a new logical version corresponding to each modification) as well as physical versions (e.g., creating new physical versions only as needed based on user queries). In some instances, two or more logical versions correspond to the same physical version.

In some implementations, the memory, or the non-transitory computer readable storage medium of the memory, further includes an input processing module (not shown) for detecting one or more user inputs or interactions from one of the one or more input devices and interpreting the detected input or interaction.

The various components shown in FIG. 3 may be implemented in hardware, software instructions for execution by one or more processors/cores, firmware, including one or more signal processing and/or application specific integrated circuits, or a combination of thereof. The processor(s) 302 execute the above described modules, programs, and instructions, and read/write from/to the data structures.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the computer readable medium 308 stores a subset of the modules and data structures identified above. In some implementations, the computer readable medium 308 stores additional modules and/or data structures not described above.

Although FIG. 3 shows server 300, FIG. 3 is intended more as functional description of the various features that may be present rather than as a structural schematic of the implementations described herein. In practice, and as recognized by those of ordinary skill in the art, items shown separately could be combined and some items could be separated. For example, in some implementations, the versioning module 340 is a sub-module of the optimization module 338. In some implementations, the optimization module 338 is a sub-module of request module 322.

Figure 4A:
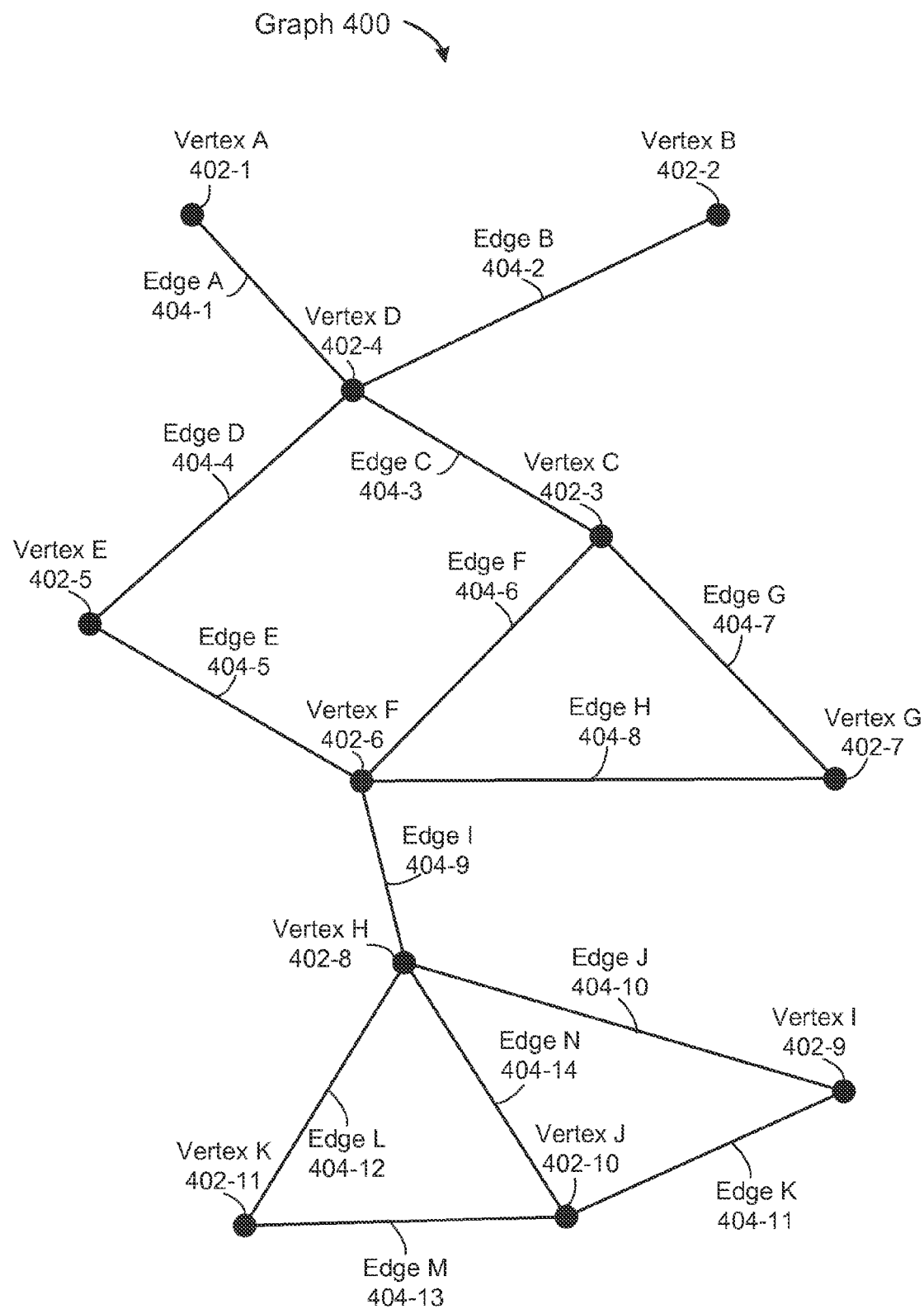
FIG. 4A is a conceptual illustration of a graph data structure in accordance with some implementations.

FIG. 4A is a conceptual illustration of a graph data structure 400 in accordance with some implementations. The graph 400 has vertices 402 (e.g., Vertex A) and edges 404 connecting vertices 402 (e.g., Edge B connecting Vertex B and Vertex D).

FIG. 4B is a conceptual table of vertices and associated properties in accordance with some implementations. The vertices in FIG. 4B correspond to the vertices of the graph 400 in FIG. 4A. FIG. 4B shows vertex associated properties table 410, including vertices 402 and their associated properties and values. For example, FIG. 4B shows the Vertex A 402-1 with corresponding properties 412 (e.g., property 412-1) and values 413 (e.g., value 413-1 corresponding to property 412-1). In some instances, a property is shared by multiple vertices. For example, the properties 412-1, 416-1, and 414 may all be the property "name" and the property values for these properties are the names of people corresponding to each vertex.

Figure 4C:
FIG. 4C is a conceptual illustration of a mapping of edges, associated endpoints, and associated properties in accordance with some implementations.

FIG. 4C is a conceptual table of edges, including associated endpoints, and associated properties in accordance with some implementations. (Each edge property, such as property 434-1 also has a corresponding property value, which is omitted from this figure.) The edges in FIG. 4C corresponding to the edges of the graph 400 in FIG. 4A. In this illustration, the graph 400 is directed, so each edge has a source vertex and a destination vertex. In some implementations, a visual representation of a directed graph displays the direction of each edge using an arrow or other indicator. Some implementations also support undirected edges.

For example, Edge A 404-1 has a source vertex Src A 430, a destination vertex Dest A 432, and corresponding properties 434. Each property has a corresponding value not illustrated in the edge table 430. In some instances, a property is shared by multiple edges. For example, the vertices may be people or retail establishments, and edges from a person vertex to an establishment vertex may represent a review of the establishment by the person. In this scenario, each edge may have a "rating" property, with property values on a numeric scale from 1 to 5.

Some implementations partition graphs based on edges, where each edge is assigned to a unique partition, but vertices may be shared by two or more partitions. This is illustrated graphically in FIG. 5A. This figure shows a graph 500 with vertices 402 and edges 404. The graph 500 is divided into three partitions 502. The top partition 502-1 includes vertices A, B, and D and edges A and B. The middle partition 502-2 includes the vertex D 402-4, as well as vertices C, E, F, and G. Although the vertex F is shared with the bottom partition 502-3, the vertex G 402-7 is entirely within the middle partition 502-2. Some implementations partition graphs to minimize the number of vertices that are in multiple partitions. As illustrated here, each edge is assigned to exactly one partition.

Figure 5A:
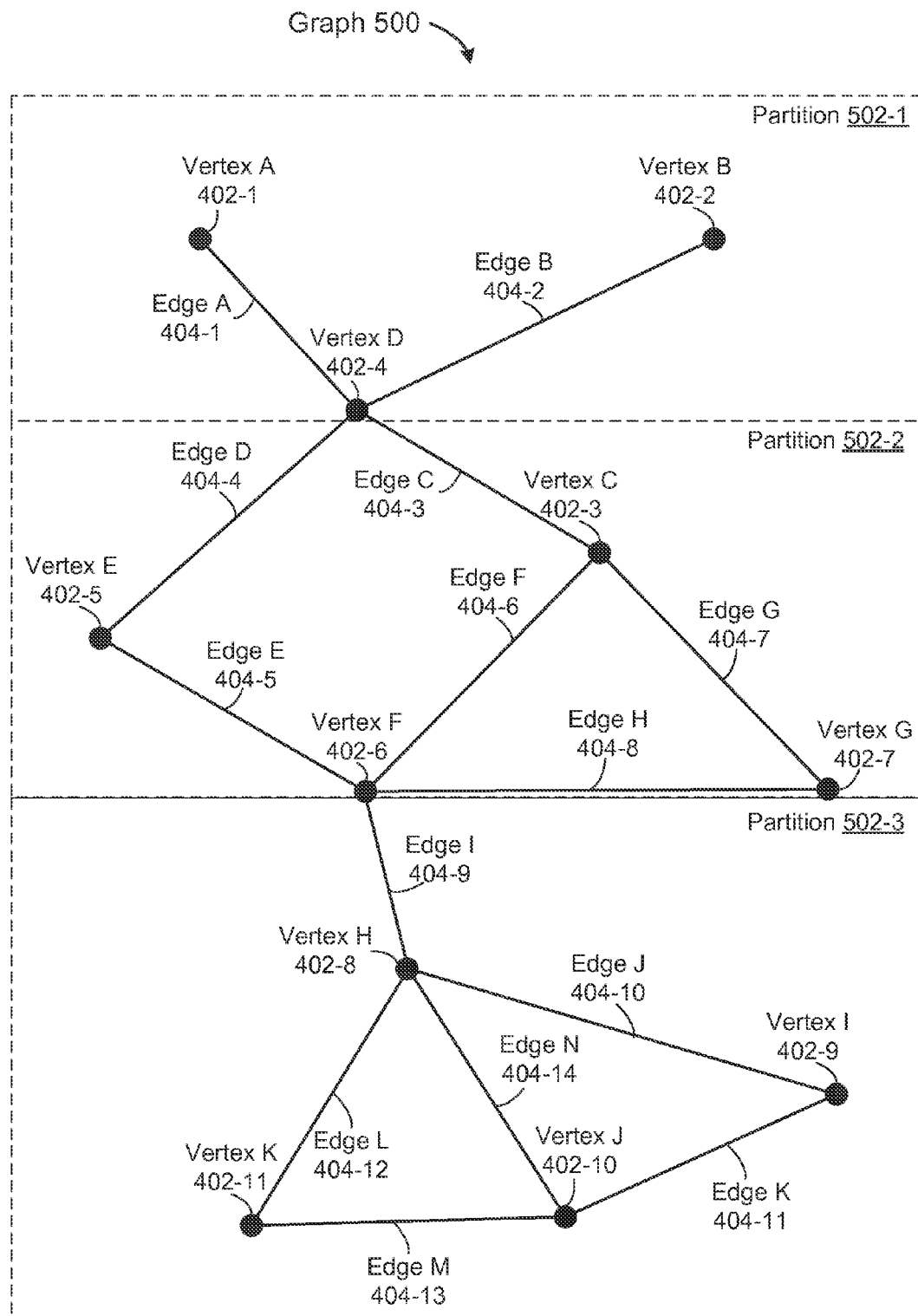
FIG. 5A is a conceptual illustration of a partitioned graph data structure in accordance with some implementations.

FIG. 5B is a conceptual table of partitions corresponding to the graph 500 in FIG. 5A. Sometimes the partitions are referred to as sections or segments. FIG. 5B shows partitions 502, corresponding vertices 402, and edges 404. For example, the first partition 502-1 includes edges A and B and vertices A, B, and D. The second partition 502-2 includes edges C, D, E, F, G, and H, and vertices C, D, E, F, and G. The vertex D 402-4 is in both the first partition 502-1 and the second partition 502-2. Finally, the third partition 502-3 includes edges I, J, K, L, M, and N, and vertices F, H, I, J, and K.

Figure 6A:
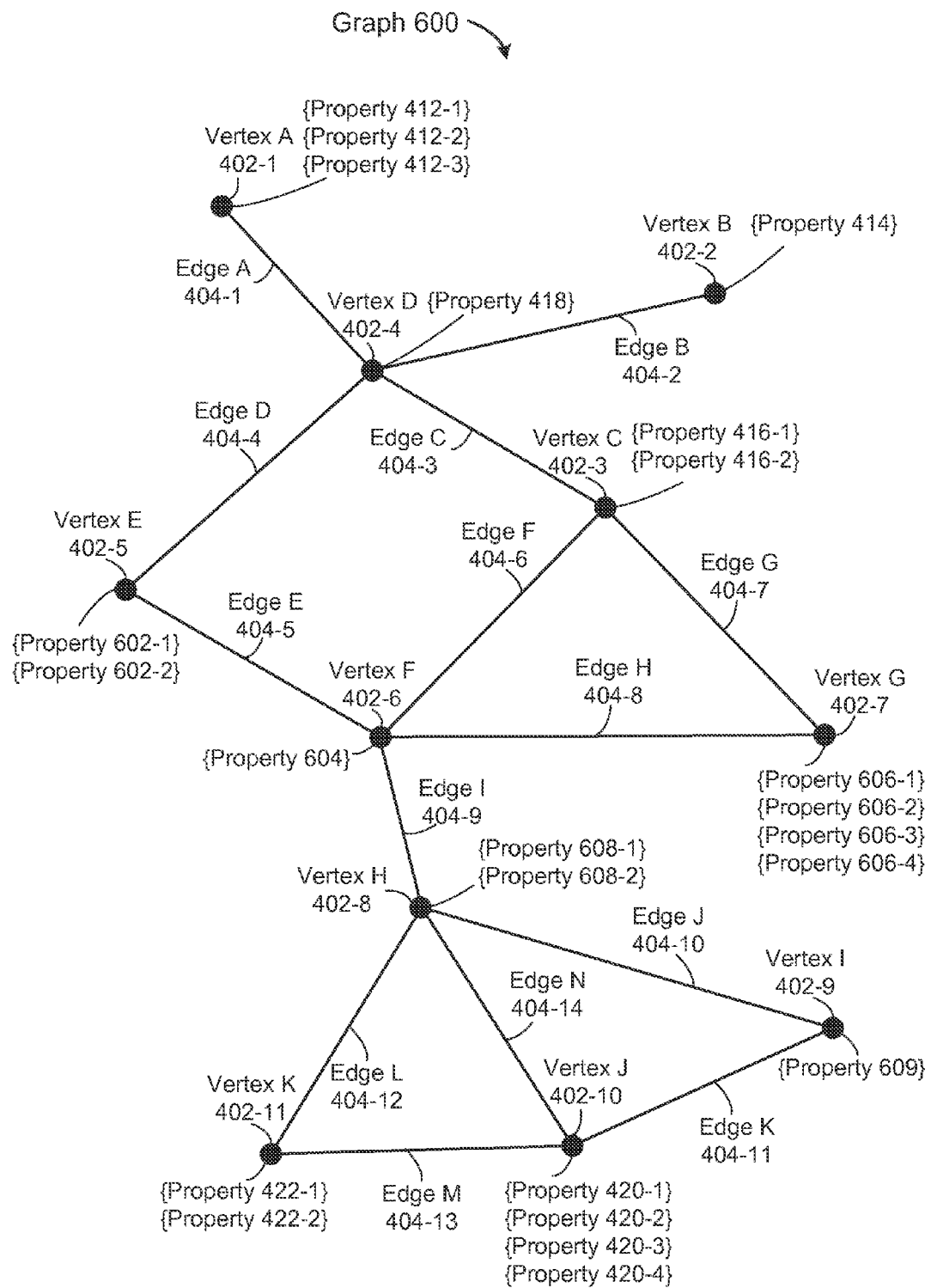
FIGS. 6A-6E are conceptual illustrations of various graph data structures in accordance with some implementations.

FIGS. 6A-6E are conceptual illustrations of various graph data structures in accordance with some implementations. FIG. 6A shows a graph 600 with vertices 402, edges 404, and properties corresponding to each vertex. Not illustrated in these figures are the properties corresponding to the edges. In this figure Vertex A has properties 412, Vertex B has property 414, and Vertex E has properties 602. In some instances, each of the vertices has the same set of properties, but in other instances, some of the vertices have more or fewer properties.

Figure 6B:
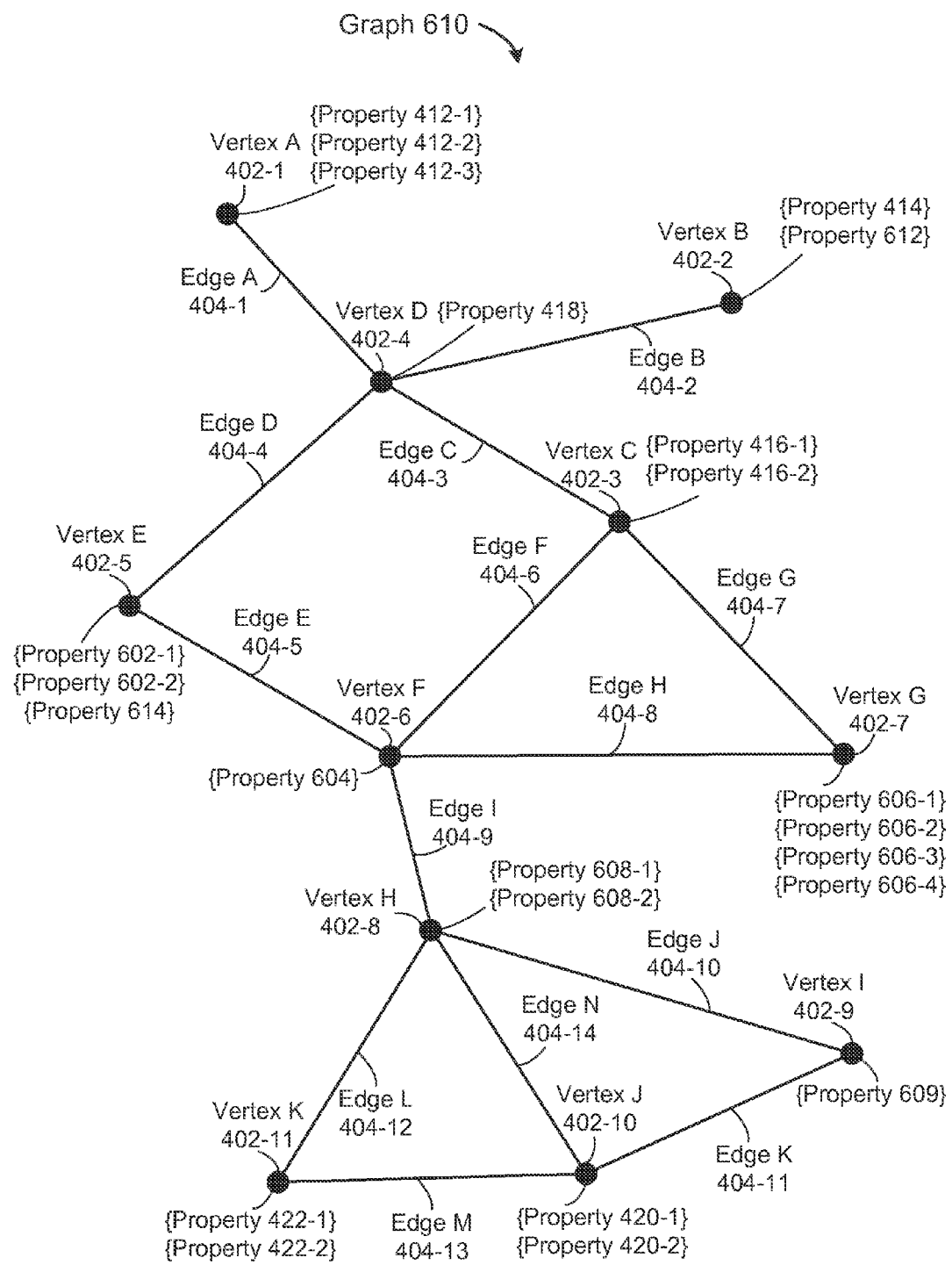

FIG. 6B illustrates modifying the graph 600 to create a new graph 610 with additional vertex properties. The graph 610 includes a new property 612 corresponding to the Vertex B 402-2 and a new property 614 corresponding to the Vertex E 402-5. In addition, the properties 420-3 and 420-4 corresponding to Vertex J in the graph 600 have been removed in the graph 610.

Figure 6C:
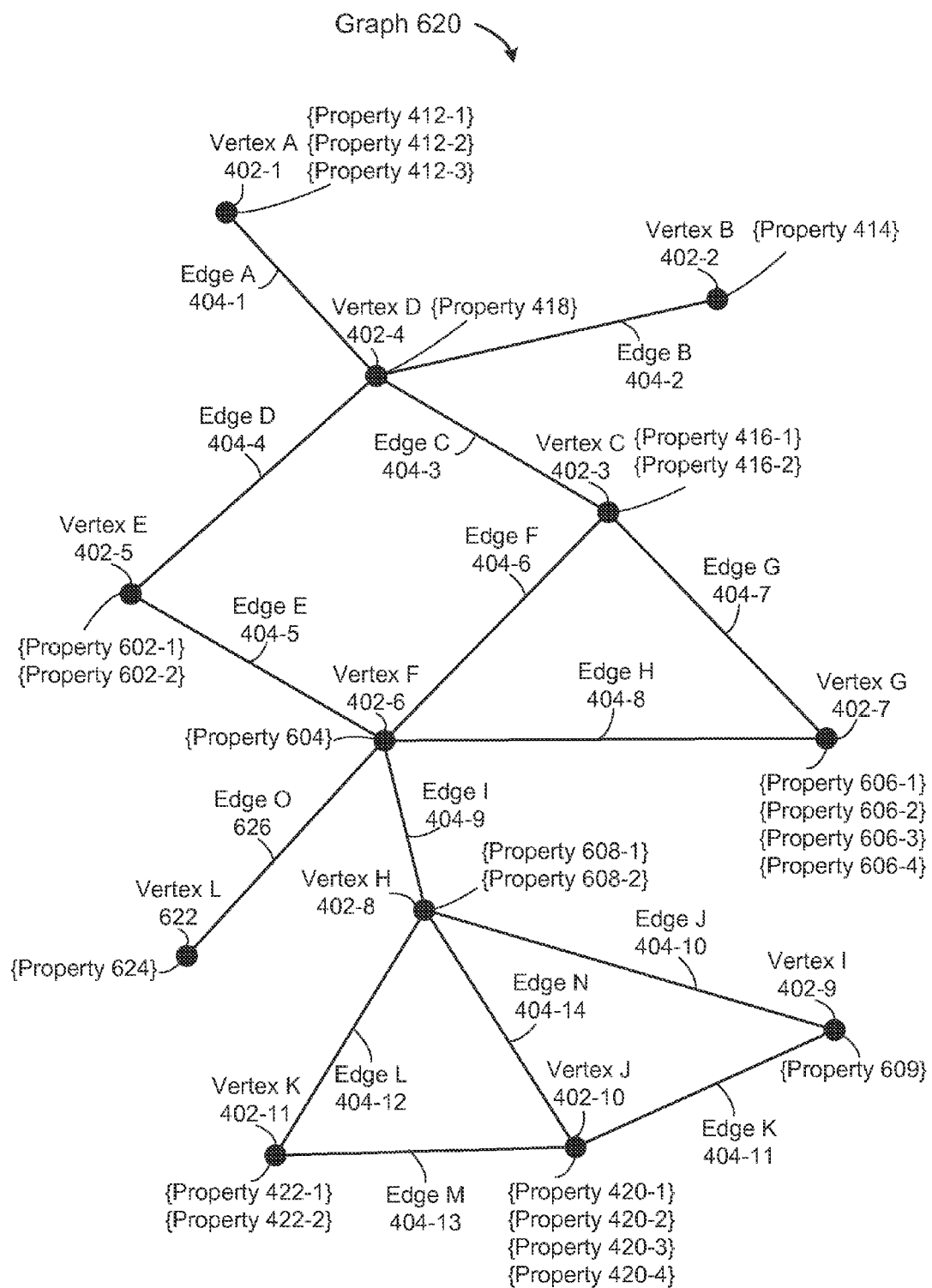

FIG. 6C illustrates modifying the graph 600 to create a new graph 620 with an additional Vertex L 622 with property 624, and a new Edge O 626 that connects the Vertex L to the Vertex F.

Figure 6D:
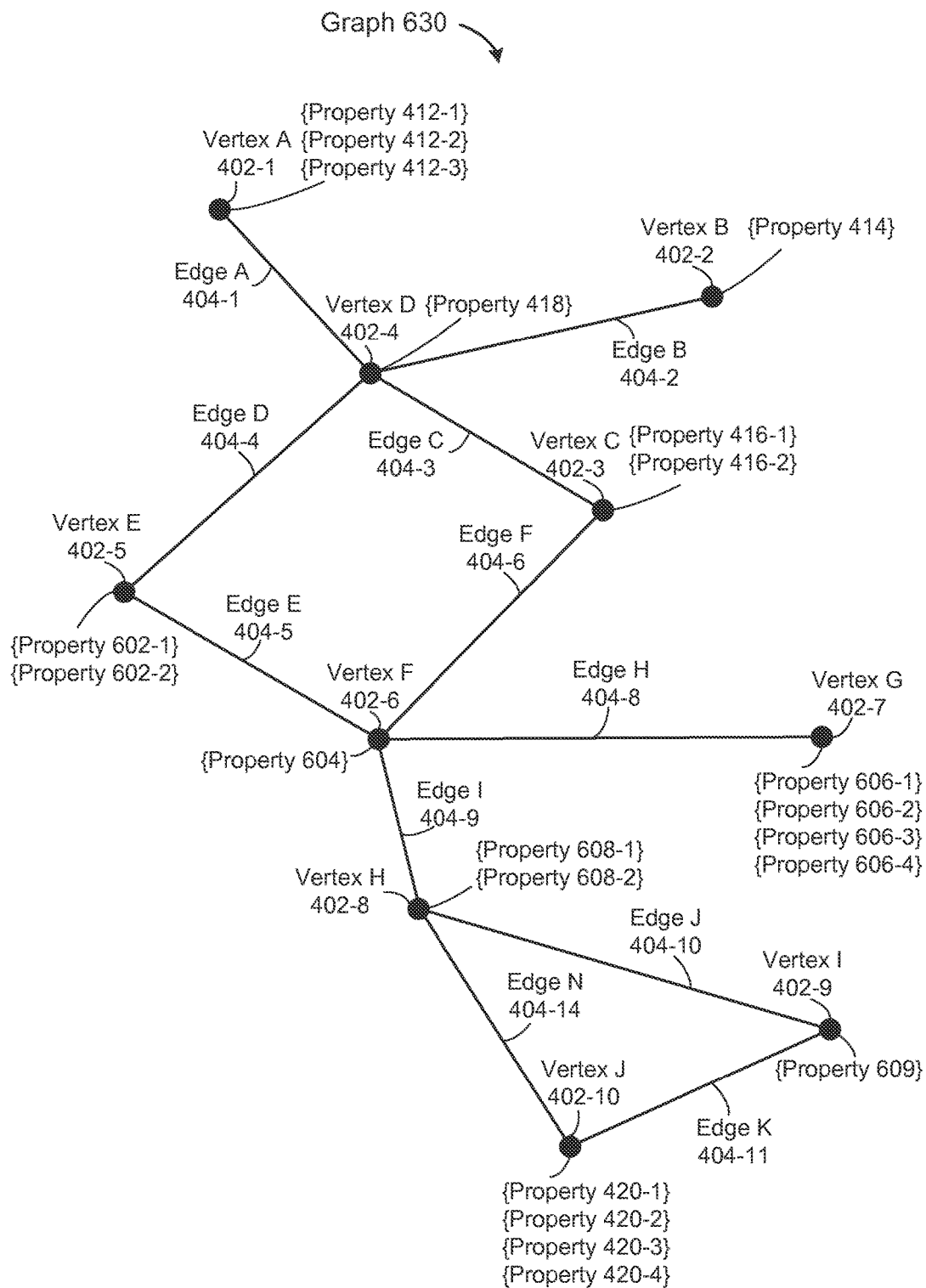

FIG. 6D illustrates modifying the graph 600 to create a new graph 630 with a vertex and some edges removed. In the graph 630, the Vertex K 402-11 has been removed (as well as its properties 422), and the edges L 404-12 and M 404-13 have also been removed. In addition, the edge G 404-7 has been removed.

Figure 6E:
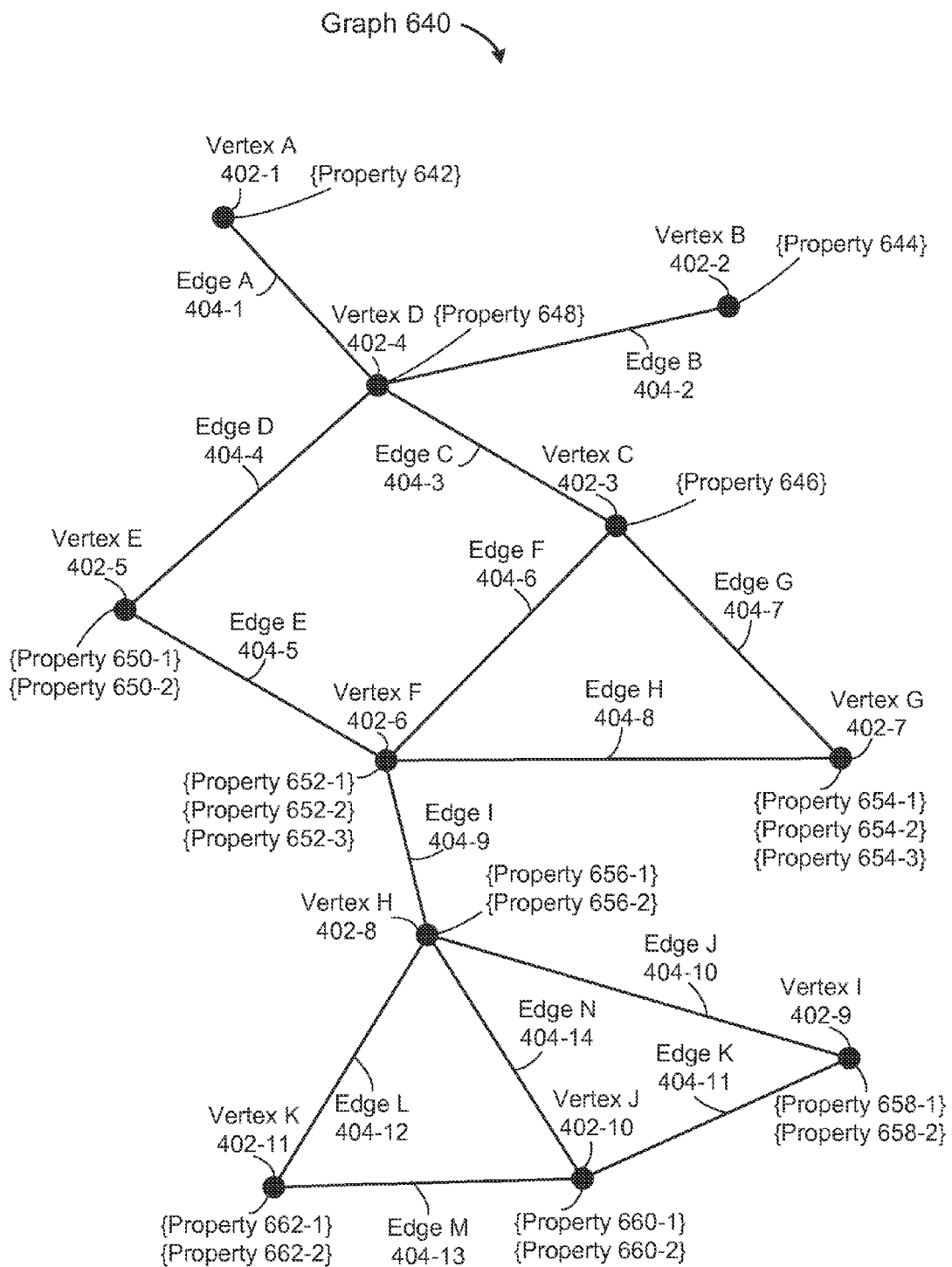

FIG. 6E shows a graph 640 that has the same vertices and edges as the graph 600, but with different vertex properties. For example, in the graph 640 Vertex A has a new property 642 rather than the previous properties 412. In some instances, the graph 640 may be created from the graph 600 by applying a graph algorithm. In some implementations, the graph 600 and the graph 640 share the same graph structure 328 in the database 324, which saves on both processing and storage resources. Although not illustrated, the new graph 640 may also have different edge properties than the graph 600.

Figure 7A:
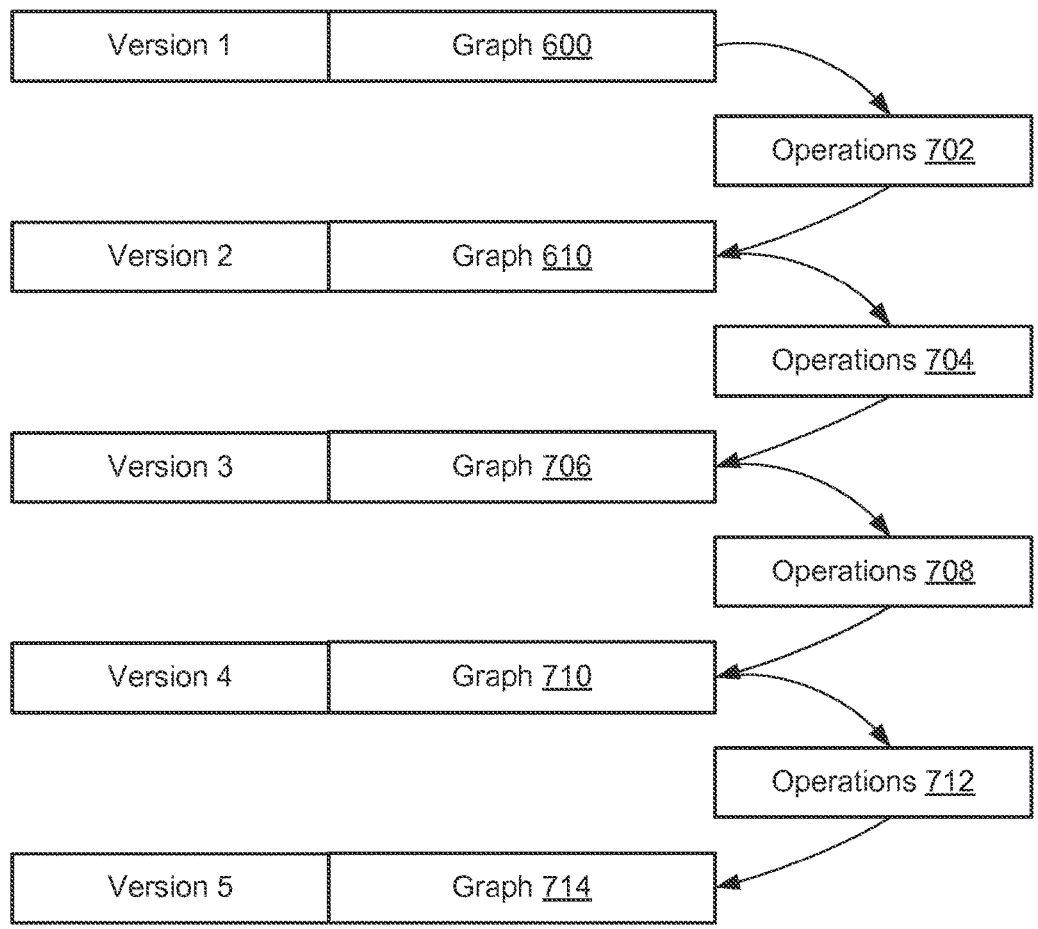
FIG. 7A is a conceptual illustration of versioned graph data structures in accordance with some implementations.

FIG. 7A is a conceptual illustration of versioned graph data structures in accordance with some implementations. FIG. 7A shows a graph 600 designated as version 1, a graph 610 designated as version 2, a graph 706 designated as version 3, a graph 710 designated as version 4, and a graph 714 designated as version 5. FIG. 7A also shows operations 702 applied to the graph 600 to generate the graph 610, operations 704 applied to the graph 610 to generate the graph 706, operations 708 applied to the graph 706 to generate the graph 710, and operations 712 applied to the graph 710 to generate the graph 714.

Figure 7B:
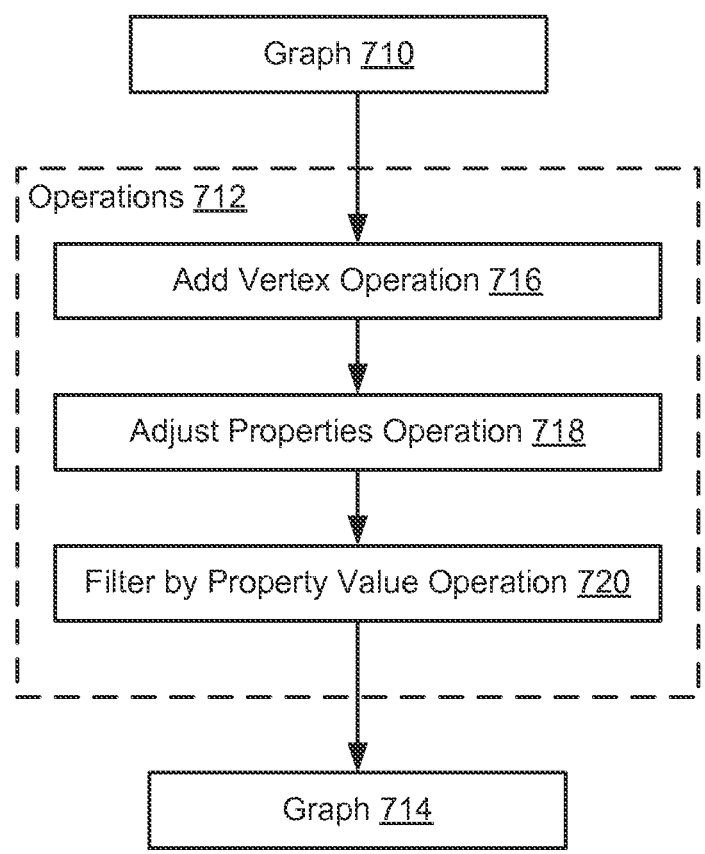
FIG. 7B is a conceptual illustration of pipelined operations involving graph data structures in accordance with some implementations.

FIG. 7B is a conceptual illustration of pipelined operations involving graph data structures in accordance with some implementations. FIG. 7B shows operations 712 applied to the graph 710 to generate the graph 714. FIG. 7B further shows the operations 712 consisting of the operations 716, 718, and 720. The add vertex operation 716 modifies the graph data corresponding to graph 710 by adding one or more vertices. The adjust properties operation 718 further modifies the graph data by adding or removing properties from edges or vertices, or by changing the property values of one or more properties. The filter by property value operation 720 further modifies the graph data by filtering out vertices or edges based on specified criteria. In some implementations, intermediate graphs are generated after each individual operation (e.g., an intermediate graph is generated after operation 716). In some implementations, the operations 712 are reorganized or combined prior to being performed. In some implementations, optimizing a set of operations may combine operations, reorder operations, or cancel operations. For example, in some instances the operation 720 is requested after the operation 716, but the operation 720 is performed before the operation 716.

Figure 8A:
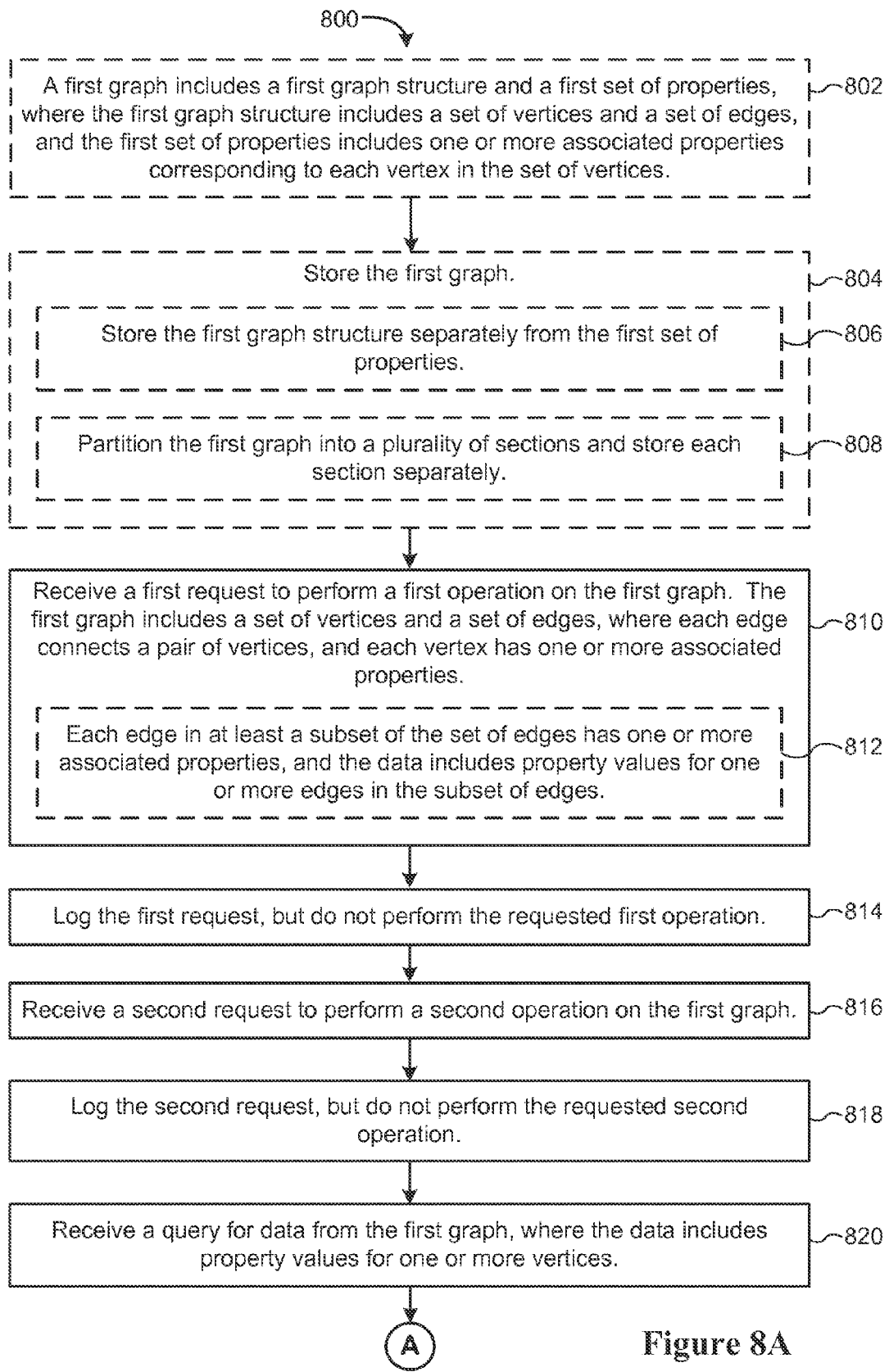
FIGS. 8A-8B provide a flowchart of a process for optimizing graph operations in accordance with some implementations.
Figure 8B:
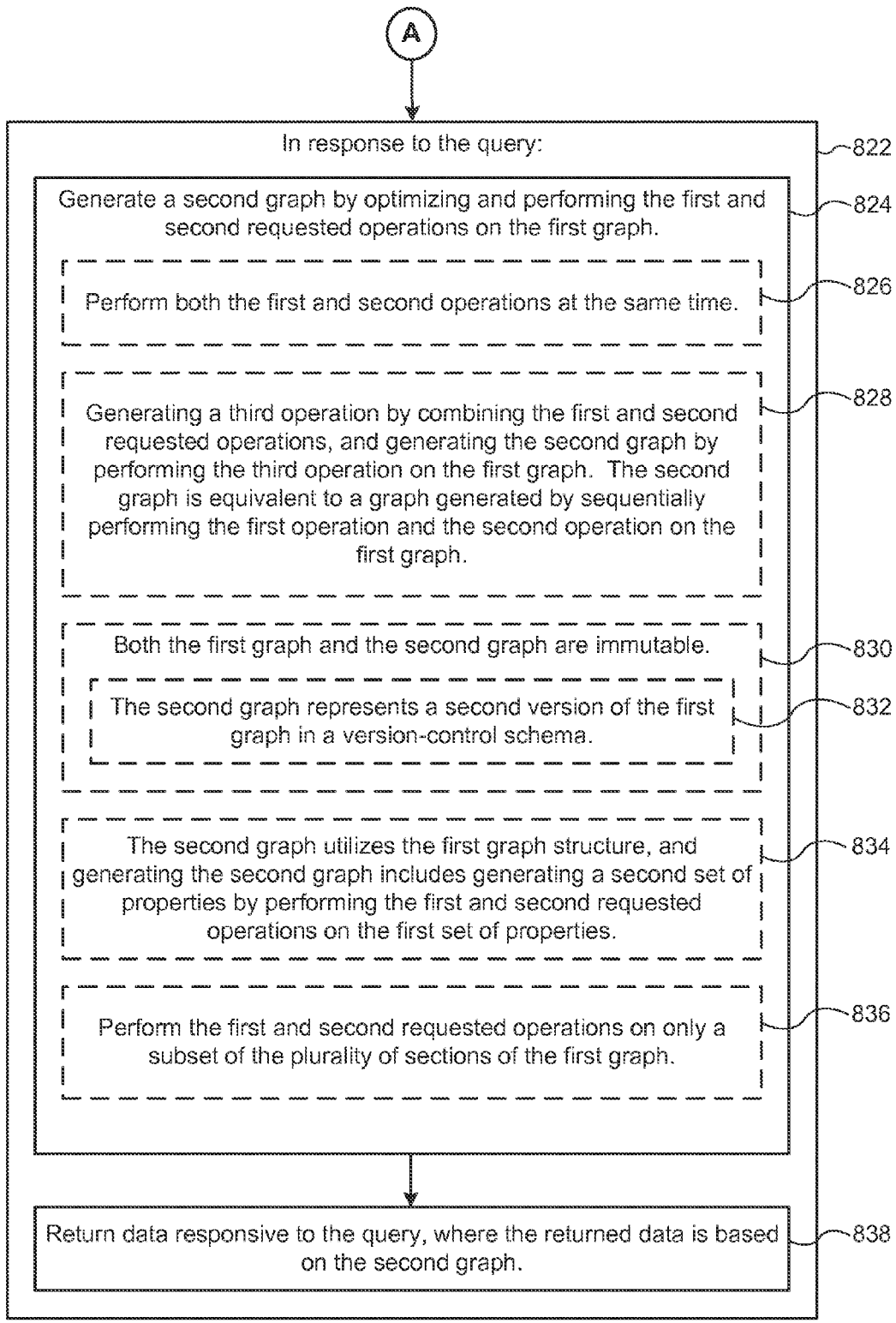

FIGS. 8A-8B provide a flowchart of a method 800 for optimizing graph operations in accordance with some implementations. In some implementations, the method 800 is performed by a dataflow processing system 100. In some implementations, the method 800 is performed by a server system 106. In some implementations, the method 800 is performed in part by a client device 102-1. In some implementations, the processing is split between a client device 102-1 and a server system 106. In some implementations, the method 800 performs instructions that are stored in a non-transitory computer readable storage medium (e.g., executed by one or more processors of a device, such as processor(s) 302 of server 300).

In some implementations, a first graph comprises (802) a first graph structure and a first set of properties. The first graph structure includes a set of vertices and a set of edges. The first set of properties includes one or more associated properties corresponding to each vertex in the set of vertices. For example, FIG. 6A shows a graph 600 comprising a graph structure (e.g., vertices 402 and edges 404) and a set of properties (e.g., properties 412, 414, 416, 418, 420, 422, 602, 604, 606, 608, and 609).

In some implementations, the system stores (804) the first graph. In some implementations, the first graph is stored at a server 300. In some implementations, the first graph is stored on a client device 102-1. In some implementations, the first graph is stored prior to receiving a first request.

In some implementations, storing the first graph comprises (806) storing the first graph structure separately from the first set of properties. For example, FIG. 3 shows a graph structure 328 stored separately from the graph properties 330. In some implementations, the graph structure is stored on a first computer readable medium and the graph properties are stored on a second computer readable medium. In some implementations, the graph structure is stored in a first database, and the graph properties are stored in a second database. In some implementations, the graph structure and properties are stored as distinct files on a file server.

In some implementations, storing the first graph comprises (808): partitioning the first graph into a plurality of sections and storing each section separately. Some implementations partition in a way that minimizes the number of vertices that are shared by multiple partitions. For example, FIG. 5A shows a graph 500 partitioned into partitions 502. In accordance with some implementations, each partition 502 is stored individually. In some implementations, the partitions are stored at a plurality of servers (e.g., the partitions are stored by a plurality of database servers 108). In some implementations, the partitions are stored in a plurality of databases 324. In some implementations, storing a partition includes storing reference data for one or more edges that extend out of the partition. The reference data is part of the metadata 342, and may specify where data for each edge is stored. For example, Edge D in FIG. 5A extends from partition 502-1 into partition 502-2. In accordance with some implementations, the partition 502-1 includes reference data regarding Edge D.

The system receives (810) a first request to perform a first operation on the first graph, where the first graph has a set of vertices and a set of edges. Each edge connects a pair of vertices, and each vertex has one or more associated properties. In some implementations, the system is a server system 106. In some implementations, the system is a client system 102-1. In some implementations, the system is a dataflow processing system 100 comprising one or more client devices and one or more server systems. In some implementations, the first request is received from a first user 101-1. In some implementations, the first request is associated with a first device 102-1. In some implementations, the first request is received by a request module 322.

In some implementations, the first graph further comprises one or more data values corresponding to each property or a vertex or edge. In some implementations, each property specifies a data type for data values corresponding to the property. For example, in some implementations, the data value types include string, integer, Boolean, character, and the like. In some implementations, each data value has a unique data type.

In some implementations, the first operation is selected from a group consisting of: a modify vertex operation, a modify edge operation, a modify properties operation, a modify data values operation, a filter operation, a copy structure operation, a show operation, and a save operation. In some implementations, the first operation is a compound operation comprising a plurality of the above operations (e.g., a compound operation comprising a modify vertex operation and a save operation). For example, FIG. 6A shows a graph 600 (e.g., a first graph) comprising vertices 402, edges 404, and associated properties for each vertex (e.g., properties 412 corresponding to Vertex A). Typically a graph also includes properties associated with each of the edges.

In some implementations, vertices share a common property. For example, in accordance with some implementations, property 412-2, property 416-1, and property 418 in FIG. 4B are the same property (e.g., a "name" property). In this example, in accordance with some implementations, value 413-2 corresponding to property 412-2 is "Tom," value 417-1 corresponding to property 416-1 is "Jerry," and value 419 corresponding to property 418 is "Sally."

In some implementations, each edge in at least a subset of the set of edges has (812) one or more associated properties. The data further includes property values for one or more edges in the subset of edges. For example, FIG. 4C shows an edge table 430 including edges 404 and corresponding properties (e.g., properties 434 corresponding to Edge A). In some implementations, edges share a common property. For example, in accordance with some implementations, the property 434-1, the property 440-1, and the property 458 are the same property (e.g., a "ratings" property) and each has a distinct (e.g., unique) corresponding property value. For example, the property 434-1 may have the property value of 4.0, the property 440-1 may have the property value of 1.0, and the property 558 may have the property value of 3.5.

The system logs (814) the first request, but does not perform the requested first operation. In some implementations, the system adds the requested first operation to an operation queue 334 as illustrated in FIG. 9. The operations in the operation queue 334 are executed in response to the system receiving a query for graph data. In some implementations, the system logs (e.g., stores) the first request in a computer readable medium 308. In some implementations, the system adds the requested first operation to a pipeline. For example, FIG. 7B shows the operations 712 including an add vertex operation 716 (e.g., a first requested operation), an adjust properties operation 718, and a filter by property value operation 720.

The system receives (816) a second request to perform a second operation on the first graph. In some implementations, the second request is received from the same user as the first request. In some implementations, the second request is received from a second user distinct from the first user. In some implementations, the second request is received via a communication interface 208. In some implementations, the second operation is any of the operations described above with respect to the first operation. For example, in accordance with some implementations, the second operation is a save operation.

The system logs (818) the second request, but does not perform the requested second operation. In some implementations, the second request is added to the same queue 334 as the first request. In some implementations, the second request is stored in a computer readable medium 308. In some implementations, the system adds the requested second operation to a pipeline. For example, FIG. 7B shows the operations 712 including the add vertex operation 716 (e.g., a first requested operation), the adjust properties operation 718 (e.g., a second requested operation), and a filter by property value operation 720. In some implementations, the system optimizes the first and second requested operations. For example, the system may generate a compound operation equivalent to the first and second operations. For example, in accordance with some implementations, a compound operation modifies the first property associated with each vertex and each edge in the first graph.

The system receives (820) a query for data from the first graph, where the data includes property values for one or more vertices. In some implementations, the query is received from a client device 102-2. In some implementations, the second request is sent from a first device 102-1 and the query is sent from a second device 102-2, distinct from the first device. In some implementations, the query is received from a user 101-2. In some implementations, the first request is sent from a first user 101-1 and the query is sent from a second user 101-2 distinct from the first user. In some implementations, in response to receiving the query, the system generates a visual representation of the data (e.g., utilizing data visualization module 314) and displays the visual representation for the user. In some implementations, the data further includes property values for one or more edges. In some implementations, the data further includes graph structure data. In some implementations, the data further includes metadata 342 corresponding to the first graph. For example, in accordance with some implementations, a query for data from the graph 600 in FIG. 6A includes property values corresponding to the properties 412, the property 414, and the property 602-1. In some implementations, the query comprises one or more of: a print command, a copy command, or a view command.

In response to the query (822), the system generates (824) a second graph by optimizing and performing the first and second requested operations on the first graph. In some implementations, the system optimizes the first and second requested operations prior to receiving the query. In some implementations, the optimizing and performing are executed by one or more processors/cores 302. In some implementations, the generating is governed (e.g., controlled) by a graph generation module 336. In some implementations, when the first graph is partitioned, the optimization module 338 determines which partitions are affected by the first and second operations and accesses/modifies only the affected partitions. In another example, the optimization module 338 adds and removes properties as illustrated in FIGS. 6A and 6B. The properties 612 and 614 are added and properties 420-3 and 420-4 are removed. In some implementations, performing the first and second requested operations comprises performing the first and second requested operations on the graph properties only, without saving a new copy of the graph structure.

In some instances, performing the first and second requested operations comprises (826) performing both the first and second operations at the same time. In some instances, the second requested operation is performed on the first graph before the first requested operation is performed. In some implementations, performing the first and second requested operations comprises simultaneously initiating the first and second operations. In some implementations, performing the first and second requested operations comprises performing the first and second requested operations asynchronously.

In some implementations, generating the second graph by optimizing and performing the first and second requested operations comprises (826) generating a third operation that combines the first and second requested operations. The second graph is generated by performing the third operation on the first graph, where the second graph is equivalent to a graph generated by sequentially performing the first operation and the second operation on the first graph. In some instances, the third operation is a compound operation. For example, the first requested operation may be a modify vertex operation and the second operation may be a filter operation. The third operation may be a filter and modify operation, which only modifies vertices not excluded by the filter.

In some implementations, the system stores the second graph. In some implementations, the second graph is stored in a database 324. In some implementations, the second graph is stored separately from the first graph. In some implementations, storing the second graph comprises storing a reference to the first graph and a list of differences between the first graph and the second graph. The differences are sometimes referred to as "deltas." In some implementations, storing the second graph comprises storing a reference to the first graph and the plurality of requested operations needed to generate the second graph from the first graph. In some implementations, storing the second graph comprises overwriting and/or erasing the first graph.

In some implementations, both the first graph and the second graph are immutable (830). In some implementations, the first and second graphs are flagged as read-only (e.g., in the metadata 342 associated with the first and second graphs). In some implementations, update requests for the second graph (e.g., requested operations referencing the second graph) result in the generation of a third graph.

In some implementations, the second graph represents (832) a second version of the first graph in a version-control schema (sometimes called a versioning schema or a version-control system). In some implementations, the version-control schema, or a portion thereof, is governed by (e.g., controlled by) a versioning module 340. For example, FIG. 7A shows a graph 600 designated as version 1 and a graph 610 designated as version 2 in a version-control schema. In some implementations, users can access data corresponding to the first graph by referencing in a query the version number corresponding to the first graph. In some implementations, users can generate a third graph (e.g., a third version) by issuing a operation request that references the version corresponding to the first graph (thus building the third version from the first version rather than from the second version). In some implementations, the second version is denoted (e.g., in the metadata 342 associated with the second graph) as the current (e.g., working) version. In some implementations, the first request selects the version of the first graph on which to apply the operation and/or subsequent operations (e.g., with the default being the current version). In some implementations, the system comprises a server system 106 and one or more client devices 102 and the graph data is stored at a database server 108 in a database 324. In some implementations, one or more of the client devices 102 includes a corresponding local database 234. In some implementations, the local database stores the current version of the first graph.

In some instances, the system receives a third request to perform a third operation and, in response to the third request, the system generates a third graph. The third graph is generated by performing the third operation on the second graph.

In some instances, the system receives a third request to perform a third operation and a second query. In response to the second query, the system generates a third graph, where the third graph is generated by performing the third operation on the second graph. In some instances, the third graph references the first graph structure. In some implementations, the third graph corresponds to a third version of the first graph. For example, in FIG. 7A the first graph is the graph 600 and the third graph is the graph 706.

In some implementations, the second graph utilizes (834) the first graph structure. The second graph has a second set of properties that are determined by performing the first and second requested operations on the first set of graph. In some implementations, the second graph references (e.g., shares) the first graph structure. For example, in accordance with some implementations, FIG. 6E shows a graph 640 generated by utilizing the structure of the graph 600 in FIG. 6A and generating a second set of properties (e.g., the properties 642-662). In some implementations, the second graph utilizes a portion of the first graph structure and generates the second graph by creating a second set of properties for only the portion of the first graph structure.

In some implementations, generating the second graph comprises (836) performing the first and second requested operations on only a subset of the sections of the first graph. In some instances, optimizing the first and second requested operations comprises determining whether each section is affected by performance of the first and second operations (e.g., whether the graph data in a respective section is modified by the first or second operations). In some instances, generating the second graph comprises performing the first and second requested operations on only a subset of the sections of the first graph. In some implementations, performing the first and second requested operations on only a subset of the plurality of sections of the first graph comprises only accessing graph data corresponding to the subset of sections. For example, suppose the requested first and second operations modify properties of the vertex C 402-3 and edges emanating from the vertex C in the partitioned graph of FIG. 5A. Because the metadata 342 indicates that the affected vertex and edges are all in the second partition 502-2, only data from the second partition 502-2 has to be read and saved, which reduces the time for retrieving the time, reduces the time for storing the modified data, and reduces the storage requirements.

The system returns (838) data responsive to the query, where the returned data is based on the second graph. In some implementations, returning data responsive to the query includes generating a visual representation of the data. The visual representations may be generated by a data visualization module 314 and/or a data visualization server 110. The visual representation is displayed using the interface module 316. In some implementations, the query is sent from a first device 102-1 and the visual representation of the data is displayed at the first device (e.g., on the display device 204). In some implementations, the query is sent from a first device and the returned data is stored on the first device (e.g., stored in computer readable medium 212). In some implementations, the query is sent from a first device 102-1 which includes a database 234. In some implementations, the database 234 stores the data responsive to the query. In some implementations, returning data responsive to the query includes sending graph data corresponding to the second graph.

FIG. 9 provides an example process flow for a dataflow processing system 100 in accordance with some implementations. In this example, a client device 102 issues commands to build and manipulate a graph, and the commands are implemented by a server system 106.

At the outset, the client device 102 requests (902) the creation of a new graph object. The request may include various information, including a data source for the new graph object. In some instances, the request does not specify a data source, in which case an "empty" graph is initially created. The server system 106 receives the request and generates (904) a graph ID 332 for the object. In some instances, the request to create the object is placed into a queue 334, but the graph ID 332 is returned (906) to the client 102. The client 102 stores (908) the graph ID 332 (e.g., in a local graph object). From the point of view of the client 102, the graph object has been created, but the graph object on the server may not actually exist.

The client device 102 now issues a sequence of requests to modify the graph, including requests 910, 914, 918, ..., 922. Each request includes the graph ID 332 to identify the proper graph object. An individual request may represent a small modification (e.g., adding one property to a single edge or creating a single new vertex), or could represent a very large modification, such as importing 10 million records into the graph from a database 234. As illustrated, there is no imposed limit on the number of modification requests, so there could be a single modification request or 50,000 requests. In some instances, the requests are being generated dynamically by a user, but in other instances, the requests are being generated by a user written program or script. In the latter case, the user written program can easily include a loop that generates thousands of requests per second. Also, the users are not required to make the requests in a way that is efficient for the server system 106, which is one reason the optimization module 338 has the opportunity to improve the overall performance.

As the server system 106 receives the modification requests, the requests are placed into an operation queue 334 for the specified graph (with graph ID 332), such as enqueue steps 912, 916, 920, ..., 924.

Subsequently, the client device 102 issues a request that queries (926) data from the graph. When the server system 106 receives the query operation, at least a portion of the graph must be constructed or modified. The graph generation module 336 or the optimization module 338 review the queue 334 of pending operations and determine (928) how to apply the operations. As illustrated above with respect to FIGS. 7B, 8A, and 8B, the optimizer 338 may select (928) various execution options. In some instances, if the graph is small or the requested operations are small, the queued operations are just executed in the order received.

In some instances, two or more of the requests are combined. For example, the requests may include 80,000 individual requests to insert individual vertices or edges into the graph. Rather than processing the insertions individually and creating an entirely new graph each time, the insertions may be grouped together in bulk (e.g., one combined operation to insert the vertices and one combined operation to insert the edges).

In another example, the initial creation of the graph could import all of the data from a spreadsheet, then subsequently delete vertices or edges based on various property values. In some implementations, the import operation and deletion operations are combined, resulting in building a graph that includes only the desired vertices and edges.

In some instances, the order of operations is rearranged. As illustrated in FIG. 7B, this can be particularly useful when a filter operation has been requested after another operation request that modifies a substantial amount of data in the graph. The optimizer can apply the modification operation to the subset of vertices or edges that have not been filtered out. In some implementations, the requested graph modification is later applied to other portions of the graph as needed, but because of the filter, the modifications are only applied to a limited subset now in order to provide a quick response for the user.

In some instances, mathematical or other operations can be combined. For example, suppose each edge in a graph has two numeric ratings that need to be combined using a weighted average. This could be implemented as a single operation $R=w_1 r_1 + w_2 r_2$, where $r_1$ and $r_2$ are existing properties of the edges. However, a user may implement this as a sequence of three operations: first, computing a new property with value $w_1 r_1$, second, computing another new property with value $w_2 r_2$, then computing the third new property that sums the other two. In some implementations, the three operation requests from the client 102 are combined into the one operation that computes the weighted average directly and only creates one new version of the graph.

After the optimizer 338 and/or the graph generation module 336 applies (928) the queued operations as needed, the request module 322 returns (930) the requested information to the client 102. As noted above, applying (928) the queued operations does not necessarily entail applying all of the modifications in their entirety. In particular, in some instances, the modifications are applied only to a subset of the graph based on the data requested by the user. In some instances, some of the modifications are not yet applied at all. This may occur, for example, when one of the modification is to add a vertex or edge that is not relevant to the user's query.

The client device 102 receives (932) the data from the server system 106 and displays the data as requested. For example, the display may include a tabular summary of the information or a portion of the graph displayed visually, such as the graph 400 in FIG. 4A.

It will be understood that, although the terms "first," "second," etc. may be used herein to describe various elements, these elements are not be limited by these terms. These terms are only used to distinguish one element from another. For example, a first record could be termed a second record, and, similarly, a record could be termed a first record, without changing the meaning of the description, so long as all occurrences of the "first record" are renamed consistently and all occurrences of the "second record" are renamed consistently. The first record and the second record are both records, but they are not the same record.

The terminology used herein is for the purpose of describing particular implementations only and is not intended to be limiting of the claims. As used in the description of the implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. For example, the method 800 was described above as performed by a system, however, in some implementations, the method 800 is performed by one or more servers. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of optimizing graph operations, performed by a computing system having one or more processors and memory, the method comprising:
   receiving a first request to perform a first operation on a first graph, wherein the first graph comprises a set of vertices and a set of edges, each edge connecting a pair of vertices, and wherein each vertex has one or more associated properties;
   logging the first request, but not performing the requested first operation;
   receiving a second request to perform a second operation on the first graph;
   logging the second request, but not performing the requested second operation;
   receiving a query for data in the first graph including property values for one or more vertices in the first graph; and
   in response to the query:
      optimizing a performance of the first and second operations;
      generating a second graph from the first graph, wherein the generation comprises performing the first and second requested operations on the first graph according to the optimization;
      performing the query on the second graph to retrieve data responsive to the query contained in the second graph including property values for one or more vertices in the second graph; and
      returning the data responsive to the query.

2. The method of claim 1, wherein performing the first and second requested operations comprises performing both the first and second operations at the same time.

3. The method of claim 1, wherein:
   optimizing the performance of the first and second operations comprises generating a third operation by combining the first and second requested operations; and
   generating the second graph comprises performing the third operation on the first graph, wherein the second graph is equivalent to a graph generated by sequentially performing the first operation and the second operation on the first graph.

4. The method of claim 1, wherein both the first graph and the second graph are immutable.

5. The method of claim 4, wherein the second graph represents a second version of the first graph in a version-control schema.

6. The method of claim 1, wherein the first graph comprises a first graph structure and a first set of properties;
   wherein the first graph structure includes the set of vertices and the set of edges; and
   wherein the first set of properties includes the one or more associated properties corresponding to each vertex in the set of vertices.

7. The method of claim 6, wherein the second graph utilizes the first graph structure; and
   wherein generating the second graph comprises generating a second set of properties by performing the first and second requested operations on the first set of properties.

8. The method of claim 6, the method further comprising storing the first graph.

9. The method of claim 8, wherein storing the first graph comprises storing the first graph structure separately from the first set of properties.

10. The method of claim 8, wherein storing the first graph comprises:
    partitioning the first graph into a plurality of sections; and
    storing each section separately.

11. The method of claim 10, wherein generating the second graph comprises performing the first and second requested operations on only a subset of the plurality of sections of the first graph.

12. The method of claim 1, wherein each edge in at least a subset of the set of edges has one or more associated properties; and wherein the data further includes property values for one or more edges in the subset of edges.

13. A system, comprising:
    one or more processors;
    memory; and
    one or more programs stored in the memory for execution by the one or more processors, the one or more programs comprising instructions for:
      receiving a first request to perform a first operation on a first graph, wherein the first graph comprises a set of vertices and a set of edges, each edge connecting a pair of vertices, and wherein each vertex has one or more associated properties;
      logging the first request, but not performing the requested first operation; receiving a second request to perform a second operation on the first graph;
      logging the second request, but not performing the requested second operation;
      receiving a query for data from the first graph including property values for one or more vertices in the first graph; and
      in response to the query:
        optimizing a performance of the first and second operations;
        generating a second graph, wherein the generation comprises performing the first and second requested operations on the first graph according to the optimization;
        performing the query on the second graph to retrieve data responsive to the query contained in the second graph including property values for one or more vertices in the second graph; and
        returning the data responsive to the query.

14. The system of claim 13, wherein the instructions for optimizing the performance of the first and second operations and generating the second graph comprise instructions for:
    generating a third operation by combining the first and second requested operations; and
    generating the second graph by performing the third operation on the first graph, wherein the second graph is equivalent to a graph generated by sequentially performing the first operation and the second operation on the first graph.

15. The system of claim 13, wherein both the first graph and the second graph are immutable.

16. The system of claim 13, the one or more programs further comprising instructions for storing the first graph, wherein storing the first graph comprises partitioning the first graph into a plurality of sections and storing each section separately.

17. The system of claim 13, wherein the first graph comprises a first graph structure and a first set of properties;
    wherein the first graph structure includes the set of vertices and the set of edges; and
    wherein the first set of properties includes the one or more associated properties corresponding to each vertex in the set of vertices.

18. A non-transitory computer readable storage medium storing one or more programs configured for execution by a computer system having one or more processors and memory storing one or more programs for execution by the one or more processors, the one or more programs comprising instructions for:
    receiving a first request to perform a first operation on a first graph, wherein the first graph comprises a set of vertices and a set of edges, each edge connecting a pair of vertices, and wherein each vertex has one or more associated properties;
    logging the first request, but not performing the requested first operation;
    receiving a second request to perform a second operation on the first graph;
    logging the second request, but not performing the requested second operation;
    receiving a query for data from the first graph including property values for one or more vertices in the first graph;
    in response to the query:
      optimizing a performance of the first and second operations;
      generating a second graph, wherein the generation comprises performing the first and second requested operations on the first graph according to the optimization;
      performing the query on the second graph to retrieve data responsive to the query contained in the second graph including property values for one or more vertices in the second graph; and
      returning the data responsive to the query.

19. The storage medium of claim 18, wherein the instructions for optimizing the performance of the first and second operations and generating the second graph comprise instructions for:
    generating a third operation by combining the first and second requested operations; and generating the second graph by performing the third operation on the first graph, wherein the second graph is equivalent to a graph generated by sequentially performing the first operation and the second operation on the first graph.

20. The storage medium of claim 18, wherein both the first graph and the second graph are immutable.

* * * * *